(12) United States Patent
Morris

(10) Patent No.: US 11,064,058 B1
(45) Date of Patent: *Jul. 13, 2021

(54) METHODS, SYSTEMS, AND COMPUTER PROGRAM PRODUCTS FOR SHARING INFORMATION FOR DETECTING AT LEAST ONE TIME PERIOD FOR A CONNECTION

(71) Applicant: JENAM TECH, LLC, Longview, TX (US)

(72) Inventor: Robert Paul Morris, Madison, GA (US)

(73) Assignee: JENAM TECH, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,103

(22) Filed: Mar. 18, 2021

Related U.S. Application Data

(63) Continuation of application No. 17/148,824, filed on Jan. 14, 2021, now Pat. No. 10,986,217, which is a
(Continued)

(51) Int. Cl.
*H04L 29/06* (2006.01)

(52) U.S. Cl.
CPC .................... *H04L 69/16* (2013.01)

(58) Field of Classification Search
CPC ........ G06F 9/5027; H04L 69/18; H04L 69/16
See application file for complete search history.

(56) References Cited

U.S. PATENT DOCUMENTS

| 5,371,852 A | 12/1994 | Attanasio et al. |
| 5,495,480 A | 2/1996 | Yoshida |

(Continued)

FOREIGN PATENT DOCUMENTS

| EP | 1242882 A2 | 9/2002 |
| WO | 2007069046 A1 | 6/2007 |

OTHER PUBLICATIONS

Office Action Summary in U.S. Appl. No. 15/694,802 dated Nov. 29, 2017.
(Continued)

*Primary Examiner* — Syed Ali
(74) *Attorney, Agent, or Firm* — Patrick E. Caldwell, Esq.; The Caldwell Firm, LLC

(57) ABSTRACT

In various embodiments, a method, apparatus, and computer program product are provided to: receive first information on which at least a first duration for detecting a first type of time period is based; generate a first packet including a first parameter field identifying first metadata for use in determining a second duration for detecting the first type of time period; set up a first connection, by sending, from the first node to a second node, the first packet to provide the first metadata to the second node, for use by the second node in determining the second duration for detecting the first type of time period; in response to detecting, based on the first duration and by the first node during at least a portion of the first connection including at least a portion of the first connection set up, a first time period of the first type of time period, at least partially close the first connection; and in response to detecting, based on the second duration and by the first node after the first duration is changed to the second duration, a second time period of the first type of time period, at least partially close the first connection.

76 Claims, 8 Drawing Sheets

Related U.S. Application Data continuation of application No. 16/914,267, filed on Jun. 26, 2020, which is a continuation of application No. 16/368,811, filed on Mar. 28, 2019, now Pat. No. 10,742,774, which is a continuation of application No. 16/040,522, filed on Jul. 19, 2018, now Pat. No. 10,375,215, which is a continuation of application No. 15/915,047, filed on Mar. 7, 2018, now Pat. No. 10,075,564, which is a continuation of application No. 15/694,802, filed on Sep. 3, 2017, now Pat. No. 9,923,995, which is a continuation-in-part of application No. 14/667,642, filed on Mar. 24, 2015, now abandoned, which is a continuation-in-part of application No. 13/477,402, filed on May 22, 2012, now abandoned, which is a continuation of application No. 12/714,454, filed on Feb. 27, 2010, now Pat. No. 8,219,606.

(56) References Cited

U.S. PATENT DOCUMENTS

| | | | |
|---|---|---|---|
| 6,212,175 B1 | 4/2001 | Harsch | |
| 6,273,622 B1 | 8/2001 | Ben-David | |
| 6,412,006 B2 | 6/2002 | Naudus | |
| 6,412,009 B1 | 6/2002 | Erickson et al. | |
| 6,519,248 B1* | 2/2003 | Valko | H04L 69/161 |
| | | | 370/352 |
| 6,584,546 B2 | 6/2003 | Kavipurapu | |
| 6,665,727 B2 | 12/2003 | Hayden | |
| 6,674,713 B1 | 1/2004 | Berg et al. | |
| 6,704,786 B1 | 3/2004 | Gupta et al. | |
| 6,757,248 B1 | 6/2004 | Li et al. | |
| 6,880,013 B2 | 4/2005 | Kashyap | |
| 6,882,637 B1* | 4/2005 | Le | H04L 1/0082 |
| | | | 341/60 |
| 6,928,054 B1* | 8/2005 | Montuno | H04L 29/06 |
| | | | 370/235 |
| 6,981,048 B1 | 12/2005 | Abdolbaghian et al. | |
| 7,002,917 B1 | 2/2006 | Saleh | |
| 7,035,214 B1 | 4/2006 | Seddigh et al. | |
| 7,050,940 B2 | 5/2006 | Basso et al. | |
| 7,152,111 B2 | 12/2006 | Allred et al. | |
| 7,251,218 B2* | 7/2007 | Jorgensen | H04L 69/165 |
| | | | 370/235 |
| 7,389,512 B2 | 6/2008 | Tucker | |
| 7,404,210 B2 | 7/2008 | Lin | |
| 7,426,569 B2 | 9/2008 | Dunk | |
| 7,428,595 B2 | 9/2008 | Deshpande | |
| 7,464,326 B2 | 12/2008 | Kawai et al. | |
| 7,535,913 B2 | 5/2009 | Minami et al. | |
| 7,606,191 B1 | 10/2009 | Breau et al. | |
| 7,636,805 B2 | 12/2009 | Rosenberg | |
| 7,684,346 B2 | 3/2010 | Valli | |
| 7,720,989 B2 | 5/2010 | Dunk | |
| 7,729,271 B2 | 6/2010 | Tsuchiya et al. | |
| 7,808,941 B2 | 10/2010 | Ramos et al. | |
| 7,848,351 B2 | 12/2010 | Kim et al. | |
| 7,876,678 B2 | 1/2011 | Ong | |
| 7,962,623 B2 | 6/2011 | Undery et al. | |
| 8,031,617 B2 | 10/2011 | Mogul et al. | |
| 8,073,964 B2 | 12/2011 | Dunk | |
| 8,077,737 B2 | 12/2011 | Ji | |
| 8,219,606 B2 | 7/2012 | Morris | |
| 8,228,830 B2 | 7/2012 | Babin et al. | |
| 8,259,716 B2 | 9/2012 | Diab | |
| 8,375,134 B2 | 2/2013 | Herzog et al. | |
| 8,483,095 B2 | 7/2013 | Hegde et al. | |
| 8,700,695 B2 | 4/2014 | Sundarrajan et al. | |
| 8,711,851 B1 | 4/2014 | Subramonian et al. | |
| 9,060,310 B2 | 6/2015 | Ji | |
| 9,923,995 B1 | 3/2018 | Morris | |
| 9,923,996 B1 | 3/2018 | Morris | |
| 10,069,945 B1 | 9/2018 | Morris | |
| 10,306,026 B1 | 5/2019 | Morris | |
| 2003/0131135 A1 | 7/2003 | Yun | |
| 2004/0093376 A1 | 5/2004 | Boor et al. | |
| 2004/0098748 A1 | 5/2004 | Bo et al. | |
| 2005/0054347 A1 | 3/2005 | Kakani | |
| 2005/0063304 A1 | 3/2005 | Sillasto et al. | |
| 2005/0135248 A1 | 6/2005 | Ahuja et al. | |
| 2005/0204013 A1 | 9/2005 | Raghunath et al. | |
| 2006/0034179 A1 | 2/2006 | Carter et al. | |
| 2006/0123079 A1* | 6/2006 | Sturniolo | H04L 69/161 |
| | | | 709/203 |
| 2006/0195547 A1 | 8/2006 | Sundarrajan et al. | |
| 2007/0005804 A1 | 1/2007 | Rideout | |
| 2007/0008884 A1 | 1/2007 | Tang | |
| 2007/0064677 A1 | 3/2007 | Xiong | |
| 2007/0086461 A1 | 4/2007 | Ward et al. | |
| 2007/0110046 A1 | 5/2007 | Farrell et al. | |
| 2007/0140193 A1 | 6/2007 | Dosa et al. | |
| 2007/0171921 A1 | 7/2007 | Wookey et al. | |
| 2008/0084826 A1 | 4/2008 | Ong | |
| 2008/0095124 A1 | 4/2008 | Ramos et al. | |
| 2008/0144603 A1 | 6/2008 | Chouksey et al. | |
| 2008/0261596 A1 | 10/2008 | Khetawat et al. | |
| 2009/0201857 A1 | 8/2009 | Daudin et al. | |
| 2009/0252072 A1 | 10/2009 | Lind et al. | |
| 2010/0057844 A1 | 3/2010 | Johnson | |
| 2010/0074273 A1 | 3/2010 | Ji | |
| 2011/0213820 A1 | 9/2011 | Morris | |

OTHER PUBLICATIONS

Office Action Summary in U.S. Appl. No. 17/079,397.
Office Action Summary in U.S. Appl. No. 17/148,824.
Palm Treo 650 Manual, published in 2004, available at https://www.wireless.att.com/download/phone_manual/treo_650.pdf.
Postel, J. "The TCP Maximum Segment Size and Related Topics," Network Working Group, RFC 879, available at https://tools.ietf.org/html/rfc879.
Postel, John(ed.), Editor; "Transmission Control Protocol—DARPA Internet Protocol Specification", RFC 793, USC/Information Sciences Institute, http://tools.ietf.org/rfc/rfc793.txt, Sep. 1981.
Protocol Enhancements for Intermittently Connected Hosts, Schütz et al., ACM SIGCOMM Computer Communication Review, vol. 35, No. 2, Jul. 2005, published in Jul. 2005.
Real-Time Transport Protocol (RTP) Payload Format and File Storage Format for the Adaptive Multi-Rate (AMR) and Adaptive Multi-Rate Wideband (AMR-WB) Audio Codecs (aka Framing Parameters for GAN) ("RFC 3267"), published in Jun. 2002, available at https://tools.ietf.org/html/rfc3267.
Requirements for Internet Hosts—Communication Layers RFC 1122 ("RFC 1122"), published in Oct. 1989, available at https://tools.ietf.org/html/rfc1122.
RFC 1001, "Protocol Standard for a NetBIOS Service on a TCP/UDP Transport: Concepts and Methods", Mar. 1987, available at https://tools/ietf.org/html/rfc1001.
Roskind, Jim "Multiplexed Stream Transport Over UDP," QUIC, Dec. 2, 2013, 51 pages.
S. Bradner "IETF Working Group Guidelines and Procedures," Network Working Group, RFC 2418, Sep. 1998.
S. Bradner, "The Internet Standards Process—Revision 3" Network Working Group, RFC 2026.
Stream Control Transmission Protocol (SCTP)—("SCTP") RFC 2960, R. Stewart et al., published in Oct. 2000, available at https://tools.ietf.org/html/rfc2960.
Sun Blade 1000 and Sun Blade 2000 Getting Started Guide, Part No. 816-3216-10, published in Jan. 2002, available at https://docs.oracle.com/cd/E19127-01/blade1000.ws/816-3216-10/816-3216-10.pdf.
T Bova et al. "Reliable UDP Protocol" (Internet-Draft for the Internet Engineering Task Force, dated Feb. 25, 1999.
TCP Abort Timeout Option (draft-eggert-tcpm-tcp-abort-timeout-option-00), published Apr. 14, 2004, available at https://tools.ietf.org/html/draft-eggert-tcpm-tcp-abort-timeout-option-00.

(56) References Cited

OTHER PUBLICATIONS

TCP User Timeout Option RFC 5482, published in Mar. 2009, available at https://tools.ietf.org/html/rfc5482.
TCP/IP Illustrated, vol. 1: The Protocols, W. Richard Stevens, published in 1994.
The Federal Networking Council, The Networking and Information Technology Research and Development Program, Oct. 10, 1997, available at https://www.nitrd.gov/historical/fnc-material.aspx.
Transmission Control Protocol RFC 793, published in Sep. 1981, available at https://tools.ietf.org/html/rfc793.
Vasseur et al., IETF RFC 5440 "Path Computation Element (PCE) Communication Protocol (PCEP)," Mar. 2009, available at https://tools.ietf.org/html/rfc5440.
"A Border Gateway Protocol 4 (BGP-4)" RFC 1771, published in Mar. 1995, available at https://tools.ietf.org/html/rfc1771.
"Discussion Lists," IETF, available at https://www.ietf.org/how/lists/discussion/.
"IETF Announce Mailing List," IETF, Apr. 2004.
"IETF Document Management System Datatracker 2 for Eggert," IETF, Datatracker.
"IETF TCP Maintenance," IETF, Apr. 2004.
"TCP Option Kind Numbers," Network Working Group, RFC 2780.
"Using SCTP as a Transport Layer Protocol for HTTP," draft-natarajan-httpbis-sctp-00.txt, published Oct. 27, 2008, available at https://tools.ietf.org/id/draft-natarajan-httpbis-sctp-00.html.
Allman, M., Paxson, V., Stevens, W., "TCP Congestion Control", RFC 2581, Internet Engineering Task Force, http://tools.ietf.org/rfc/rfc2581.txt,—Apr. 1999.
Apogee Communications, Rapport de Veille Technologique Securite No. 69, (Security Technology Watch Report) (Apr. 2004).
Berners-Lee et al., IETF RFC 1866 "Hypertext Markup Language—2.0", Nov. 1995, available at https://tools.ietf.org/html/rfc1866.
BT Mobile BlackBerry Enterprise Server 4.0, Information Sheet, published in 2005, available at https://www.bt.com/static/i/media/pdf/blackberry_ITadvice_june05_pdf.
Busatto, Fabio, "TCP Keepalive Overview", TCP Keepalive HOWTO, Section 2, http://tldp.org/HOWTO/html_single/TCP-Keepalive-HOWTO/#overview, accessed Jan. 2010, May 2007.
Cisco 7200 Series Network Processing Engine NPE-G1 Data Sheet, published in Jun. 2006, available at https://www.cisco.com/c/en/us/products/collateral/interfaces-modules/network-processor/modules/product_data_sheet09186a00800c6bd6.pdf.
Cisco 7200 Series Router Architecture, published in Feb. 2008, available at https://www.cisco.com/c/en/us/support/docs/routers/7200-series-routers/5810-arch-7200-5810.pdf.
Cisco 7200 VXR Series Routers Data Sheet, published in 2008.
Cisco 7200 VXR Series Routers Quick Look Guide published in Nov. 2007.
Cisco IOS BGP Configuration Guide, Release 12.4T, Chapter: Cisco BGP Overview, published in 2007, available at https://www.cisco.com/c/en/us/td/docs/ios/12_2sr/12_2srb/feature/guide/tbgp_c/tbrbover.html.
Cisco IOS BGP Configuration Guide, Release 12.4T, Chapter: Configuring BGP Neighbor Session Options ("Cisco IOS BGP Options"), published in 2007, available at https://www.cisco.com/c/en/us/td/docs/ios/12_2sr/12_2srb/feature/guide/tbgp_c,/brbpeer.html.
Cristian Zamfir, Live Migration of User Environments Across WideArea Networks, Master's Thesis, Department of Computing Science, University of Glasgow (Oct. 2008).
Digital cellular telecommunications system (Phase 2+); Generic access to the A/Gb interface; Stage 2 (3GPP TS 43.318 version 6.7.0 Release 6) ("TS 43.318"), published in Jun. 2006.
Eggert, L, Gont, F., "TCP User Timeout Option", RFC 5482, Internet Engineering Task Force (IEFT), http://tools.ietf.org/html/rfc5482.txt, Mar. 2009.
F. Gont, "TCP Adaptive User TimeOut (AUTO) Option," Network Working Group, May 19, 2004.
Heavens, Ian, IETF, "Problems with TCP Connections Terminated by RSTs or Timers," Internet Draft, Jul. 1995, available at https://tools.ietf.org/html/draft-heavens-problems-rsts-00.html.
HP Compaq Business Desktop d530 Series, QuickSpecs ("d530 QuickSpecs"), published on Jul. 14, 2003, available at http://www.hp.com/ecomcat/hpcatalog/specs/emeapsg/99/D530SERIES.pdf.
HP iPAQ H4000 Series User Guide, published in Aug. 2003.
Hypertext Transfer Protocol—HTTP/1.1 RFC 2068, published in Jan. 1997, available at https://tools.ietf.org/html/rfc2068.
Hypertext Transfer Protocol RFC 2616, published in Jun. 1999, available at https://tools.ietf.org/html/rfc2616.
IESG Statement: Normative and Informative References, Apr. 19, 2006, available at https://www.ietf.org/blog/iesg-statement-normative-and-informative-references/.
IETF Document Management System Datatracker 1 for Eggert, available at https://datatracker.ietf.org/doc/draft-eggert-tpm-tcp-abort-timeout-option/.
IETF face-to-face meeting (San Diego, Aug. 2, 2004).
Internet Domain Survey, Jan. 2010, Internet Systems Consortium available at https://downloads.isc.org/www/survey/reports/2010/01/.
J. Moy, "The OSPF Specification," Network Working Group, RFC 1131, Oct. 1989.
Jacobson et al, "TCP Extensions for High Performance," Network Working Group, RFC 1323, May 1002, available at https://tools.ietf.org/html/rfc1323.
Jacobson et al, "TCP Extensions for Long-Delay Paths," Network Working Group, RFC 1072, Oct. 1988, available at https://tools.ietf.org/html/rfc1072.
Jim Roskind, QUIC Quick UDP Internet Connections, Multiplexed Stream Transport Over UDP, Nov. 7, 2013 (first draft earlier), available at https://www.ietf.org/proceedings/88/slides/slides-88-tsvarea-10.pdf.
Jon Postel, "Transmission Control Protocol," DARPA Internet Program Protocol Specification, RFC 793, dated Sep. 1981.
Koziero, Charles M., TCP Connection Management and Problem Handling, the Connection Reset Function, and TCP "Keepalives", The TCP/IP Guide, p. 3, http://www.tcpipguide.com/free/t_TCPConnectionManagementandProblemHandlingtheConnec-3.htm, accessed Feb. 2010, (c) 2003-2010.
Mathis et al, "TCP Selective Acknowledgment Options," Network Working Group, RFC 2018, Oct. 1996, available at https://tools.ietf.org/html/rfc2018.
Mathis, M., Mahdave, J., Floyd, S., Romanow, A., "TCP Selective Acknowledgement Options", RFC 2018, Internet Engineering Task Force, http://tools.ietf.org/rfc/rfc2018.txt, Oct. 1996.
Mobile IP Traversal of Network Address Translation (NAT) Devices RFC 3519 ("RFC 3519"), published in Apr. 2003, available at https://tools.ietf.org/html/rfc3519.
Nagle, John, "Congestion Control in IP/TCP Internetworks", RFC 896, Ford Aerospace and Communications Corporation, http://tools.ietf.org/rfc/rfc896.txt, Jan. 1984.
NetEx "'C' Configuration Manager and NetEx® Alternate Path Retry (APR) Release 4.0" software reference manual, published in 2002, available at http://www.netexsw.com/nesi/support/ReleasedDocs/ConfMgr/man-cnet-conf-mgr-02.pdf.
NetEx/IP™ for UNIX Systems Release 6.0 Software Reference Manual, published in 2004, available at http://www.netexsw.com/nesi/support/ReleasedDocs/Hxx0IP/man-hunxip-03.pdf.
Network Support for Intermittently Connected Mobile Nodes, Simon Schutz, published on Jun. 13, 2004, available at https://eggert.org/students/schuetz-thesis.pdf.
Network Working Group, "QUIC: A UDP-Based Secure and Reliable Transport for HTTP/2 draft-tsvwg-quic-protocol-00", Jun. 17, 2015.
Office Action Summary in U.S. Appl. No. 12/714,063 dated Jun. 21, 2012.
Office Action Summary in U.S. Appl. No. 12/714,063 dated Mar. 4, 2013.
Office Action Summary in U.S. Appl. No. 12/714,063 dated Sep. 27, 2013.
Office Action Summary in U.S. Appl. No. 12/714,454 dated Feb. 23, 2012.

(56) References Cited

OTHER PUBLICATIONS

Office Action Summary in U.S. Appl. No. 13/477,402 dated Sep. 24, 2014.

* cited by examiner

Figures are adapted from RFC 793

METHODS, SYSTEMS, AND COMPUTER PROGRAM PRODUCTS FOR SHARING INFORMATION FOR DETECTING AT LEAST ONE TIME PERIOD FOR A CONNECTION

RELATED APPLICATIONS

This application is a continuation of, and claims priority to U.S. patent application Ser. No. 17/148,824, entitled "METHODS, SYSTEMS, AND COMPUTER PROGRAM PRODUCTS FOR SHARING INFORMATION FOR DETECTING AT LEAST ONE TIME PERIOD FOR A CONNECTION", filed Jan. 14, 2021, which in turn is a continuation of, and claims priority to U.S. patent application Ser. No. 16/914,267 entitled "METHODS, SYSTEMS, AND COMPUTER PROGRAM PRODUCTS FOR SHARING INFORMATION FOR DETECTING AN IDLE TCP CONNECTION," filed on Jun. 26, 2020, which in turn is a continuation of, and claims priority to U.S. patent application Ser. No. 16/368,811 entitled "METHODS, SYSTEMS, AND COMPUTER PROGRAM PRODUCTS FOR SHARING INFORMATION FOR DETECTING AN IDLE TCP CONNECTION," filed on Mar. 28, 2019, which in turn is a continuation of, and claims priority to U.S. patent application Ser. No. 16/040,522, now U.S. Pat. No. 10,375,215, entitled "METHODS, SYSTEMS, AND COMPUTER PROGRAM PRODUCTS FOR SHARING INFORMATION FOR DETECTING AN IDLE TCP CONNECTION," filed on Jul. 19, 2018, which in turn, is a continuation of, and claims priority to U.S. patent application Ser. No. 15/915,047, now U.S. Pat. No. 10,075,564, entitled "METHODS, SYSTEMS, AND COMPUTER PROGRAM PRODUCTS FOR SHARING INFORMATION FOR DETECTING AN IDLE TCP CONNECTION," filed on Mar. 7, 2018 which, in turn, is a continuation of, and claims priority to U.S. patent application Ser. No. 15/694,802, now U.S. Pat. No. 9,923,995, entitled "METHODS, SYSTEMS, AND COMPUTER PROGRAM PRODUCTS FOR SHARING INFORMATION FOR DETECTING AN IDLE TCP CONNECTION," filed on Sep. 3, 2017 which, in turn, is a continuation-in-part of, and claims priority to U.S. patent application Ser. No. 14/667,642, entitled "METHODS, SYSTEMS, AND COMPUTER PROGRAM PRODUCTS FOR SELECTING A RESOURCE BASED ON A MEASURE OF A PROCESSING COST," filed on Mar. 24, 2015 which, in turn, is a continuation-in-part of and claims priority to U.S. patent application Ser. No. 13/477,402, entitled "METHODS, SYSTEMS, AND COMPUTER PROGRAM PRODUCTS FOR SHARING INFORMATION FOR DETECTING AN IDLE TCP CONNECTION," filed May 22, 2012 which is a continuation of and claims priority to U.S. patent application Ser. No. 12/714,454, now U.S. Pat. No. 8,219,606, entitled "METHODS, SYSTEMS, AND COMPUTER PROGRAM PRODUCTS FOR SHARING INFORMATION FOR DETECTING AN IDLE TCP CONNECTION," filed Feb. 27, 2010.

U.S. patent application Ser. No. 12/714,454, entitled "METHODS, SYSTEMS, AND COMPUTER PROGRAM PRODUCTS FOR SHARING INFORMATION FOR DETECTING AN IDLE TCP CONNECTION," filed Feb. 27, 2010 is incorporated herein by reference in its entirety for all purposes.

This application is related to the following commonly owned U.S. patent applications, the entire disclosure of which is incorporated by reference herein in its entirety for all purposes: application Ser. No. 12/714,063 filed on 2010 Feb. 26, entitled "Methods, Systems, and Program Products for Detecting an Idle TCP Connection".

BACKGROUND

Various implementations of the transmission control protocol (TCP) in network nodes support a number of options that are not negotiated or even communicated between or among any of the nodes. Some of these options are included in the specification of the TCP while others are not. For example, the TCP keep-alive option is supported by a number of implementations of the TCP. It is not, however, part of the TCP specification as described in "Request for Comments" (RFC) document RFC 793 edited by John Postel, titled "Transmission Control Protocol, DARPA Internet Program Internet Protocol Specification" (September 1981), which is incorporated here in its entirety by reference. One, both, or neither node including an endpoint in a TCP connection may support a keep-alive option for the connection. Each node supports or does not support keep-alive for a TCP connection based on each node's requirements without consideration for the other node in the TCP connection.

With respect to the keep-alive option, some argue that it is unnecessary and that it can waste network bandwidth. Some of these critics point out that a keep-alive packet can bring down a TCP connection. Further, since nodes including endpoints in a TCP connection do not cooperate in supporting the keep-alive option, the nodes may operate in opposition to one another and/or may waste resources by duplicating function, according to critics of the keep-alive option.

Proponents of the keep-alive option claim there is a benefit to detecting a dead peer/partner endpoint sooner. A node providing TCP keep-alive can also indirectly detect when a network is so congested that two nodes with endpoints in a TCP connection are effectively disconnected. Proponents argue that keep-alive can keep an inactive TCP connection open. For example, some network nodes such as firewalls are configured to close TCP connections determined to be idle or inactive in order to recover resources. Keep-alive can prevent this. This is good from the perspective of the node sending keep-alive packets, but the keep-alive packets might cause the firewall to waste resources and possibly block or terminate TCP connections with other nodes.

TCP keep-alive and the debate of its benefits and faults have been around for decades. To date no mechanism to allow two TCP connection endpoints to cooperate in supporting the keep-alive option has been proposed or implemented. The broader issue of enabling cooperation and negotiation between nodes in a TCP connection in detecting and managing idle, underactive, and/or dead TCP connections remains unaddressed.

Accordingly, there exists a need for methods, systems, and computer program products for sharing information for detecting an idle TCP connection.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In various embodiments, a method, apparatus, and computer program product are provided to: receive first information on which at least a first duration for detecting a first type of time period is based; generate a first packet including a first parameter field identifying first metadata for use in determining a second duration for detecting the first type of time period; set up a first connection, by sending, from the first node to a second node, the first packet to provide the first metadata to the second node, for use by the second node in determining the second duration for detecting the first type of time period; in response to detecting, based on the first duration and by the first node during at least a portion of the first connection including at least a portion of the first connection set up, a first time period of the first type of time period, at least partially close the first connection; and in response to detecting, based on the second duration and by the first node after the first duration is changed to the second duration, a second time period of the first type of time period, at least partially close the first connection.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
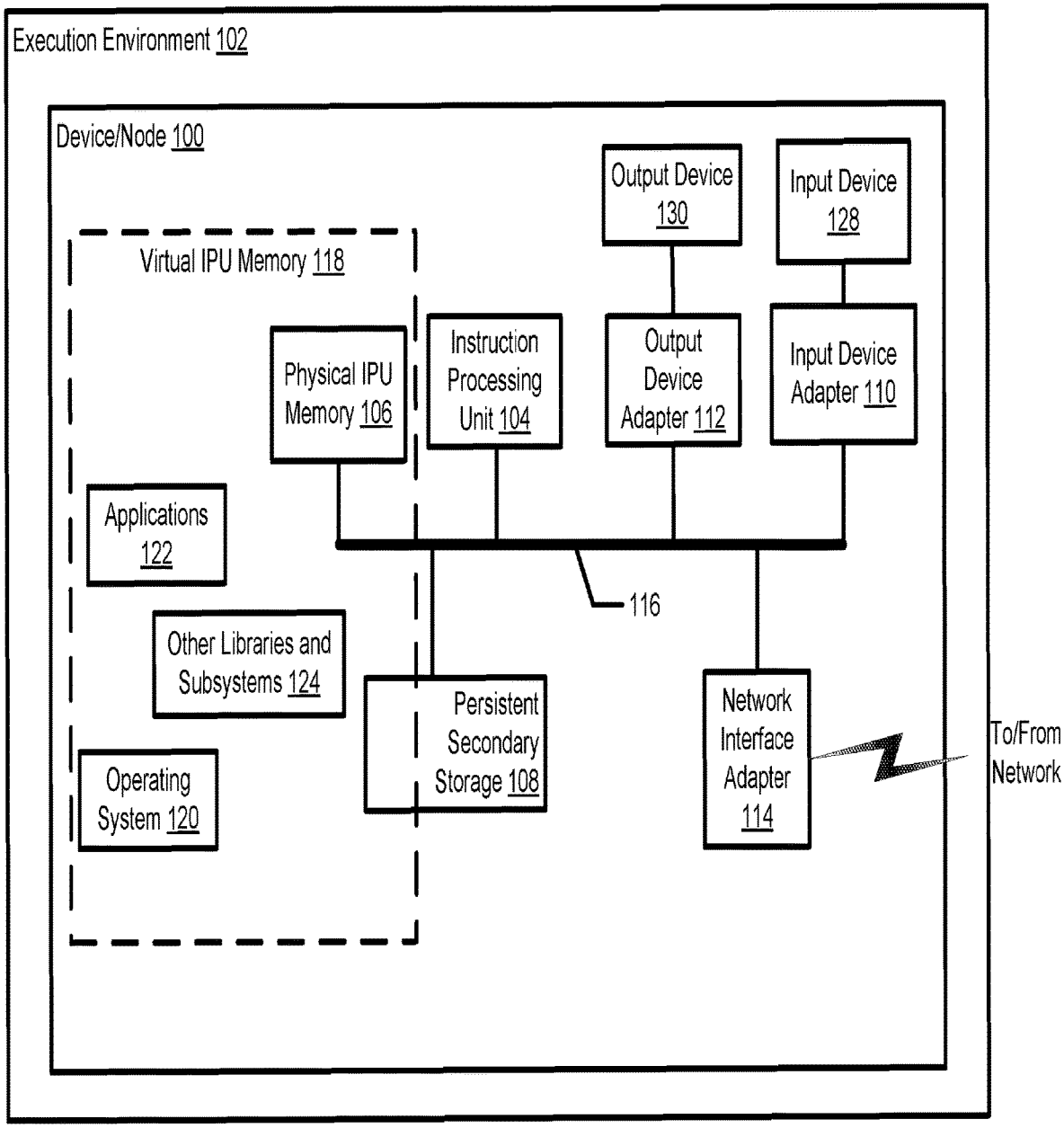
FIG. 1 is a block diagram illustrating an exemplary hardware device included in and/or otherwise providing an execution environment in which the subject matter may be implemented.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein.

An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, hand-held and other mobile devices, multiprocessor devices, distributed devices, consumer electronic devices, and/or network-enabled devices. Those skilled in the art will understand that the components illustrated in FIG. 1 are exemplary and may vary by particular execution environment.

FIG. 1 illustrates hardware device 100 included in execution environment 102 which includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as key or keypad hardware, keyboard adapter, and/or mouse adapter; output device adapter 112, such as a display or audio adapter for presenting information to a user; a network interface, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSP), graphics processing units (GPU), application-specific integrated circuits (ASIC), and/or field programmable gate arrays (FPGA).

IPU 104 may access machine code instructions and data via one or more memory address spaces in addition to the physical memory address space. A memory address space includes addresses identifying locations in an IPU memory. IPU 104 may have more than one IPU memory. Thus, IPU 104 may have more than one memory address space. IPU 104 may access a location in an IPU memory by processing an address identifying the location. The processed address may be in an operand of a machine code instruction and/or may be identified in a register or other portion of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual IPU memory is referred to as a virtual memory address space; its addresses are referred to as virtual memory addresses; and its IPU memory is known as a virtual IPU memory or virtual memory. The term IPU memory may refer to physical IPU memory 106 and/or virtual IPU memory 118 depending on the context in which the term is used.

Various types of memory technologies may be included in physical IPU memory 106. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical IPU memory 106 may include volatile memory as illustrated in the previous sentence and/or may include nonvolatile memory such as nonvolatile flash RAM (NVRAM) and/or read-only memory (ROM).

Persistent secondary storage 108 may include one or more flash memory storage devices, one or more hard disk drives, one or more magnetic disk drives, and/or one or more optical disk drives. Persistent secondary storage may include removable media. The drives and their associated computer-readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in an IPU memory. FIG. 1 illustrates execution environment 102 including operating system 120, one or more applications 122, other program code and/or data components illustrated by other libraries and subsystems 124.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an output device is a device such as a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices (not shown) via one or more network interfaces. The terms "communication interface" and "network interface" are used interchangeably. FIG. 1 illustrates network interface adapter 114 as a network interface included in execution environment 102 to operatively couple device 100 to a network. The terms "network node" and "node" in this document both refer to a device having a network interface operatively coupled to a network.

Exemplary network interfaces include wireless network adapters and wired network adapters. Exemplary wireless networks include a BLUETOOTH network, a wireless 802.11 network, and/or a wireless telephony network (e.g., a cellular, PCS, CDMA, and/or GSM network). Exemplary wired networks include various types of LANs, wide area networks (WANs), and personal area networks (PANs). Exemplary network adapters for wired networks include Ethernet adapters, Token-ring adapters, FDDI adapters, asynchronous transfer mode (ATM) adapters, and modems of various types. Exemplary networks also include intranets and internets such as the Internet.

Figure 2:
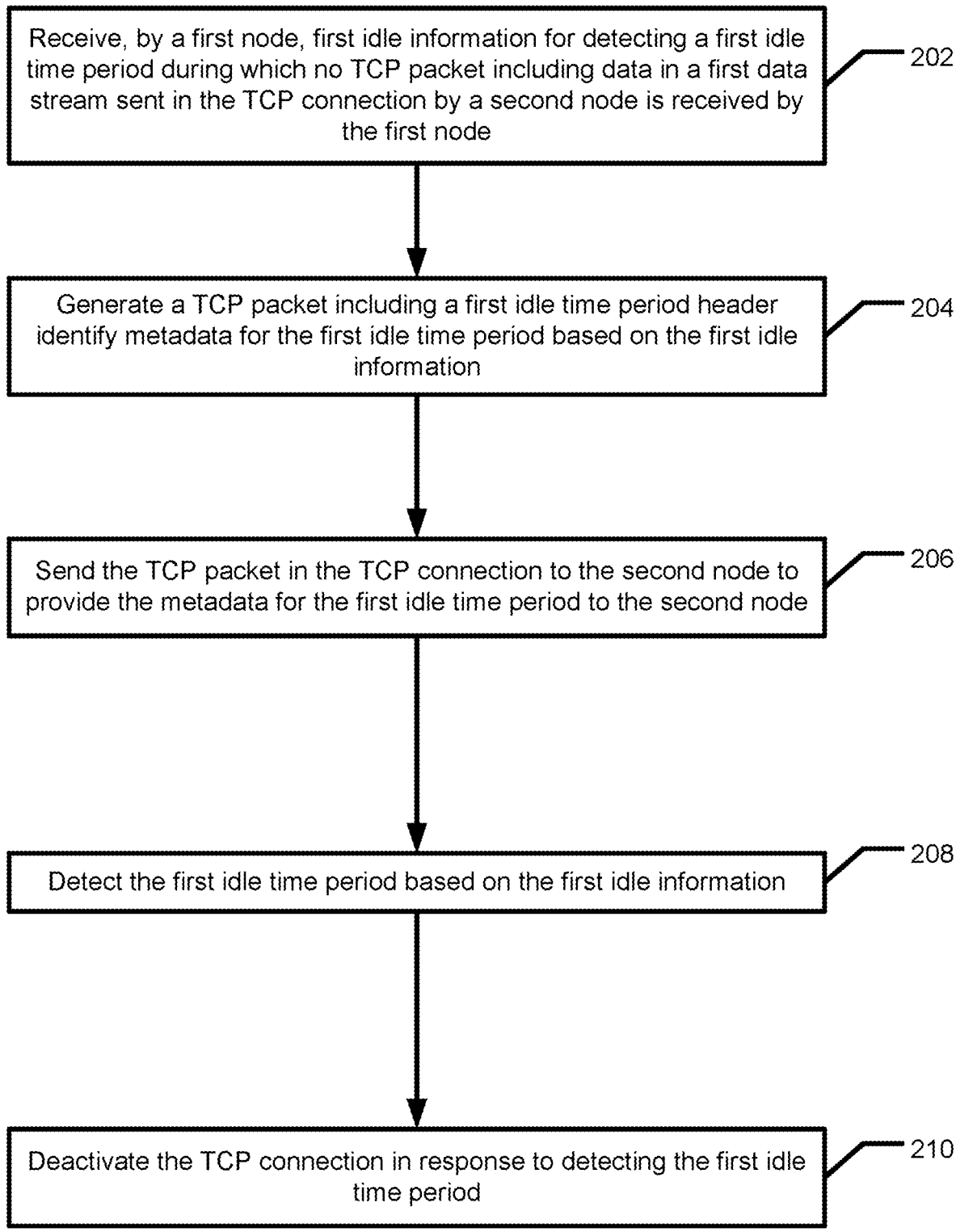
FIG. 2 is a flow diagram illustrating a method for sharing information for detecting an idle TCP connection according to an aspect of the subject matter described herein.
Figure 3:
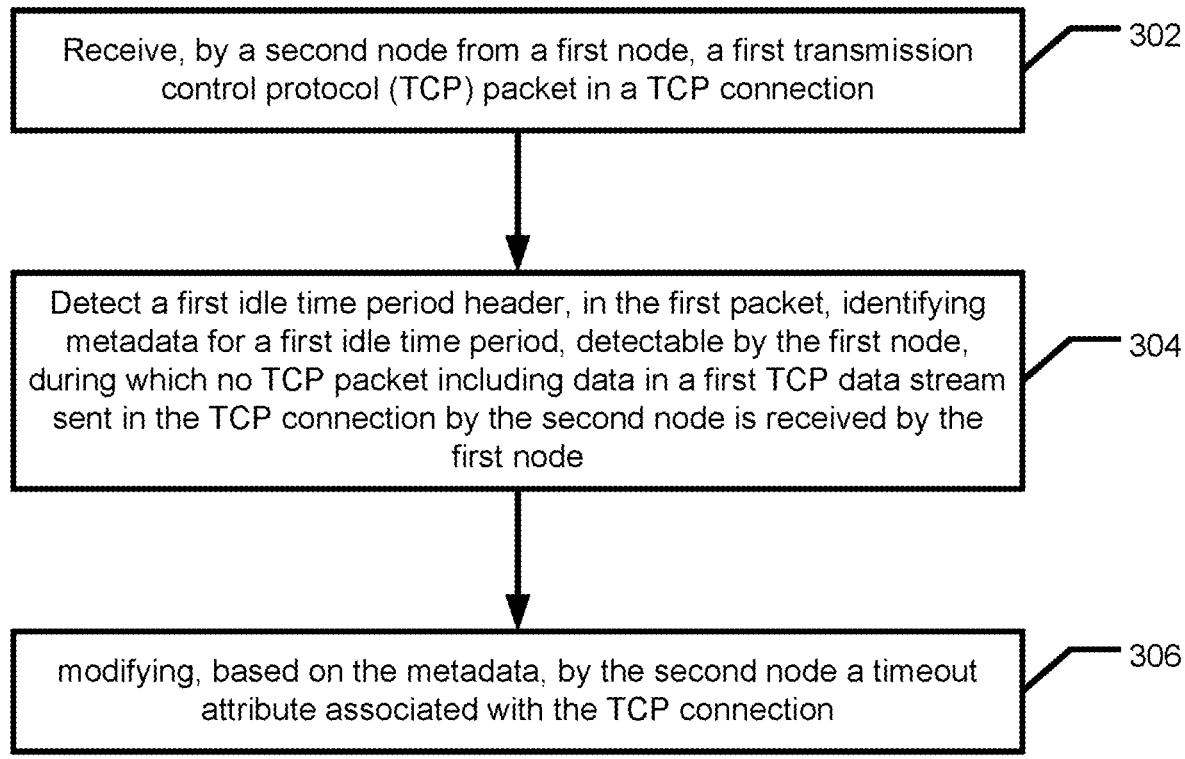
FIG. 3 is a flow diagram illustrating another method for sharing information for detecting an idle TCP connection according to another aspect of the subject matter described herein.
Figures 4A, 4B:
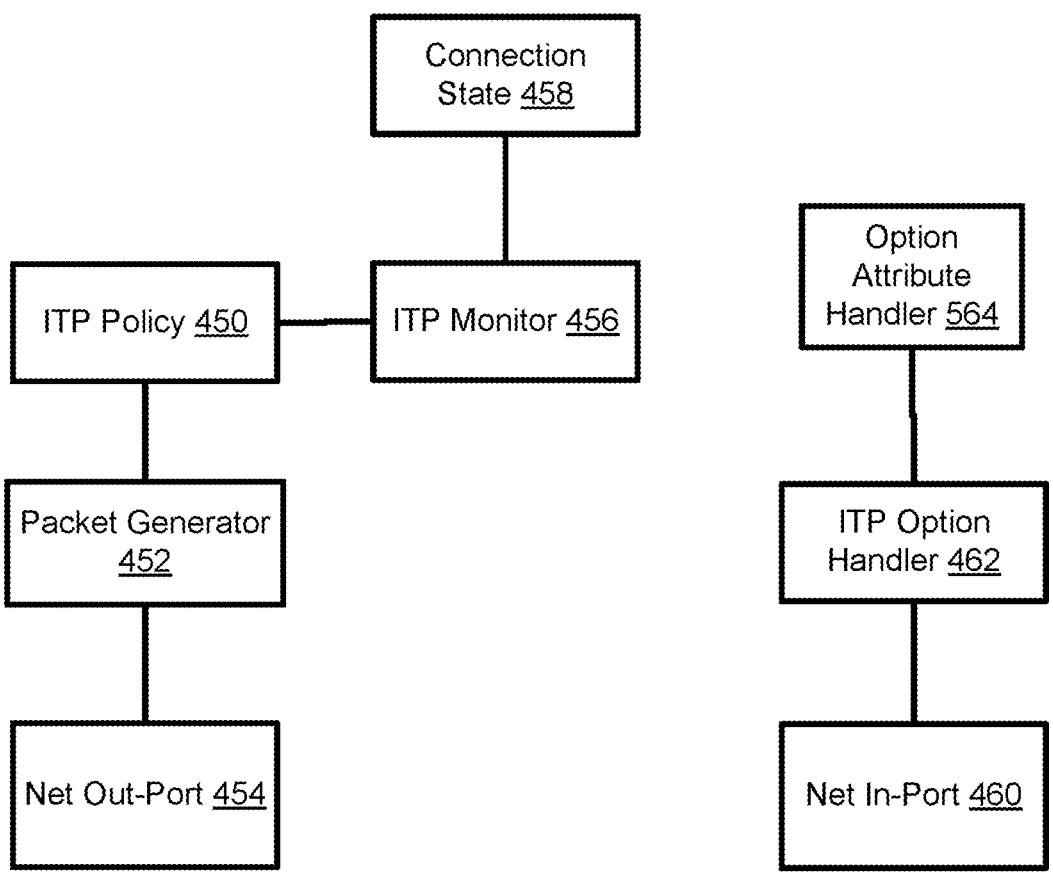
FIG. 4a and FIG. 4b show a block a diagram illustrating an arrangement of components for sharing information for detecting an idle TCP connection according to a further aspect of the subject matter described herein.

FIG. 2 is a flow diagram illustrating a first method for sharing information for detecting an idle TCP connection according to an exemplary aspect of the subject matter described herein. FIG. 3 is a flow diagram illustrating a second method for sharing information for detecting an idle TCP connection according to an exemplary aspect of the subject matter described herein. FIG. 4a is a block diagram illustrating a system for sharing information for detecting an idle TCP connection according to the first method in FIG. 2. FIG. 4b is a block diagram illustrating a system for sharing information for detecting an idle TCP connection according to the second method in FIG. 3. It is expected that many, if not most, systems configured to perform one of the methods illustrated in FIG. 2 and FIG. 3 will also be configured to perform the other method.

A system for sharing information for detecting an idle TCP connection according to the method illustrated in FIG. 2 includes an execution environment, such as execution environment 102 in FIG. 1, including an instruction processing unit, such as IPU 104, configured to process an instruction included in at least one of an idle time period policy component 450, a packet generator component 452, and a net out-port component 454, a idle time period monitor component 456, and a connection state component 458 illustrated in FIG. 4a.

A system for sharing information for detecting an idle TCP connection performing the method illustrated in FIG. 3 includes an execution environment, such as execution environment 102 in FIG. 1, including an instruction processing unit, such as IPU 104, configured to process an instruction included in at least one of a net in-port component 460, an idle time period option handler component 462, an option attribute handler component 464 illustrated in FIG. 4b.

Figure 5:
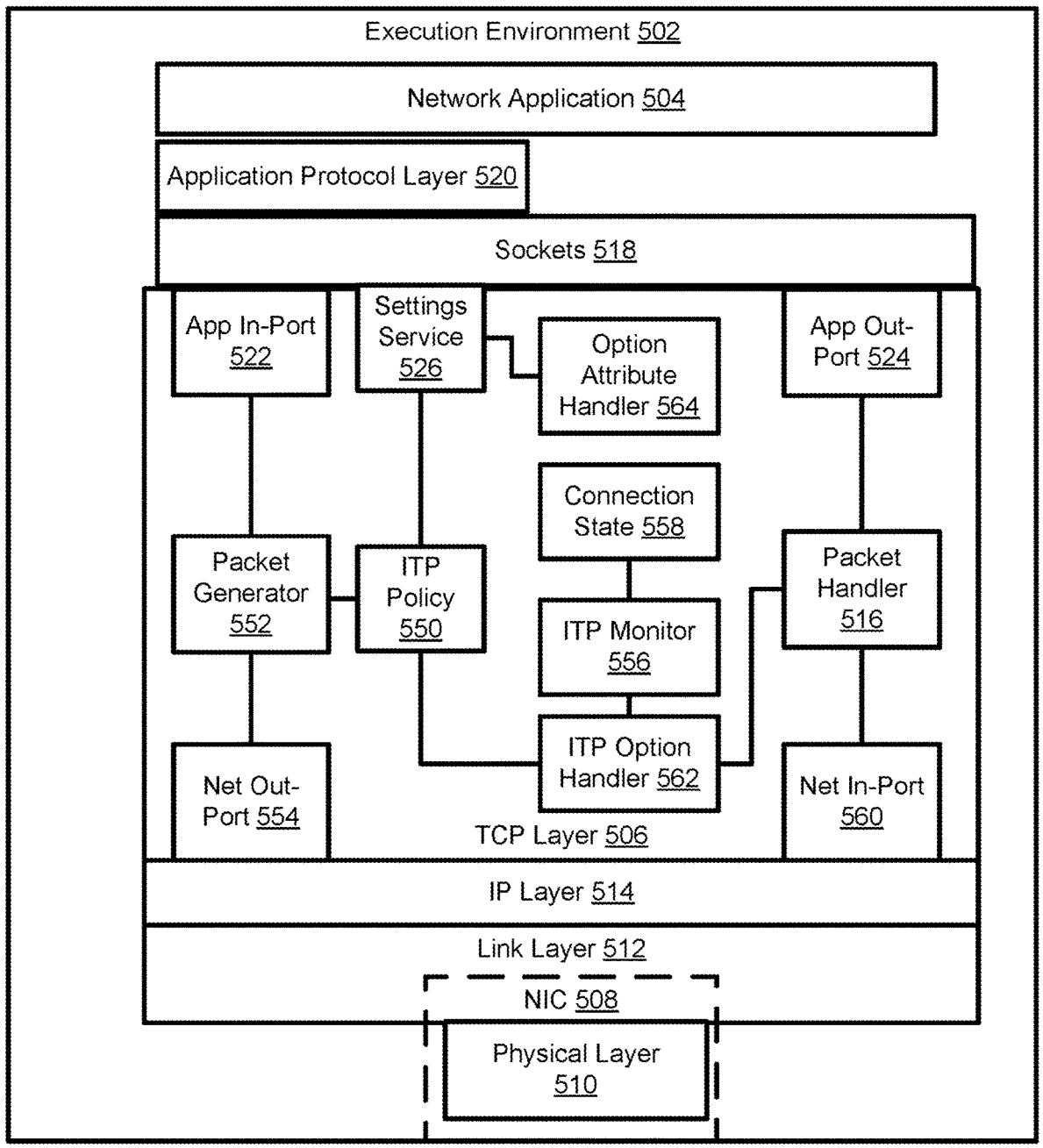
FIG. 5 is a block diagram illustrating an arrangement of components for sharing information for detecting an idle TCP connection according to still another aspect of the subject matter described herein.

Components illustrated in FIG. 4a may be adapted for performing the method illustrated in FIG. 2 in a number of execution environments. Components illustrated in FIG. 4b may be adapted for performing the method illustrated in FIG. 3 in a number of execution environments. FIG. 5 is a block diagram illustrating adaptations and/or analogs of the components of FIG. 4a and FIG. 4b in exemplary execution environment 502 including or otherwise provided by one or more nodes. The method depicted in FIG. 2 and the method depicted in FIG. 3 may be carried out by some or all of the exemplary components and/or their analogs.

The components illustrated in FIG. 4 and FIG. 5 may be included in or otherwise may be combined with some or all of the components of FIG. 1 to create a variety of arrangements of components according to the subject matter described herein.

Figure 6:
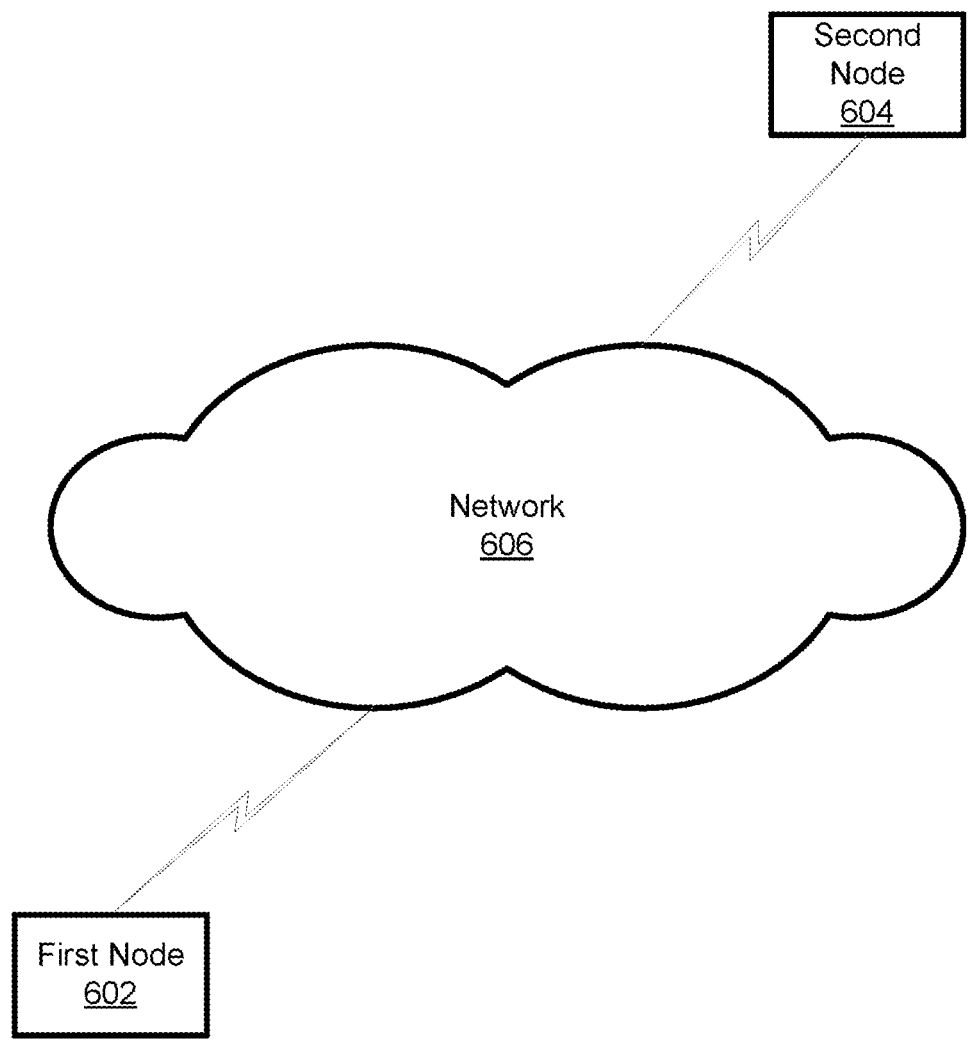
FIG. 6 is a network diagram illustrating an exemplary system for sharing information for detecting an idle TCP connection according to an aspect of the subject matter described herein.
Figure 7:
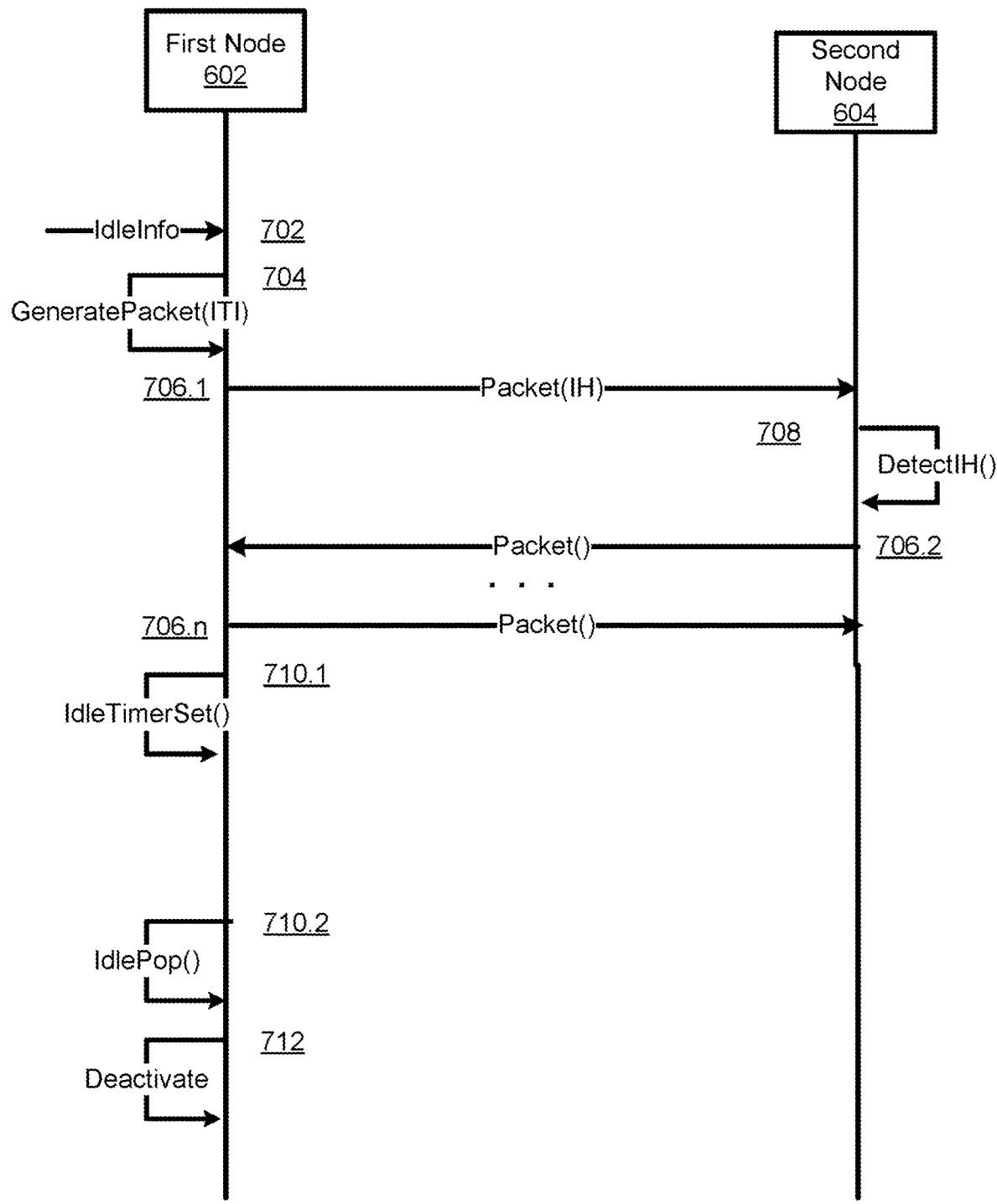
FIG. 7 is a message flow diagram illustrating an exemplary data and execution flow for sharing information for detecting an idle TCP connection according to an aspect of the subject matter described herein.

FIG. 6 illustrates first node 602 and second node 604 as exemplary devices included in and/or otherwise adapted for providing a suitable execution environment, such as execution environment 502 illustrated in FIG. 5, for an adaptation of the arrangement of components in FIG. 4*a* and an adaptation of the arrangement of components in FIG. 4*b*. As illustrated in FIG. 6, first node 602 and second node 604 are operatively coupled to network 606 via respective network interfaces enabling first node 602 and second node 604 to communicate. FIG. 7 is a message flow diagram illustrating an exemplary exchange of messages within and between first node 602 and second node 604 according to the subject matter described herein.

As stated, the various adaptations of the arrangements of components in FIG. 4*a* and in FIG. 4*b* described herein are not exhaustive.

In FIG. 5, execution environment 502 illustrates a network application 504 operating in a node configured to communicate with one or more other nodes via the TCP supported by TCP layer component 506. For example, first node 602 may be included in and/or provide execution environment 502. Network application 504 may be a first application configured to communicate with an application operating in second node 604 via network 606. Second node 604 may be included in and/or provide another instance of execution environment 502. The operation of both first node 602 and second node 604 are described with respect to execution environment 502. For ease of illustration, both first node 602 and second node 604 are configured with adaptations of the arrangement in FIG. 4*a* and the arrangement in FIG. 4*b*. As such, the description of components and corresponding operations with respect to execution environment 502 in FIG. 5 is applicable to both first node 602 and second node 604 in FIG. 6.

In FIG. 5, network interface card (NIC) 508 is an exemplification of a network interface illustrated in FIG. 1 by network interface adapter 114. NIC 508 includes a physical layer component 510 operatively coupling execution environment 502 to one or more physical media for carrying communication signals. The media may be wired, such as an Ethernet LAN operating over CAT 6 cabling, or may be wireless such as an 802.11n LAN. Other exemplary physical layer protocols and corresponding media are identified above.

NIC 508 may also include a portion of link layer component 512. Link layer component 512 may provide for communication between two nodes in a point-to-point communication and/or two nodes in a local area network (LAN). Exemplary link layers and, their protocols have been described above including FDDI, ATM, and Ethernet. A portion of link layer component 512 is external to NIC 508. The external portion may be realized as a device driver for NIC 508.

Link layer component 512 may receive data formatted as one or more internet protocol (IP) packets from internet protocol (IP) layer component 514. Link layer component 512 packages data from IP layer component 514 according to the particular link layer protocol supported. Analogously, link layer component 512 interprets data, received as signals transmitted by the physical media operatively coupled to physical layer component 510, according to a particular link layer protocol supported. Link layer component 512 may strip off link layer specific data and transfer the payload of link layer transmissions to IP layer component 514.

IP layer component 514 illustrated in FIG. 5 is configured to communicate with one or more remote nodes over a LAN and/or a network of networks such as an intranet or the Internet. IP layer component 514 may receive data formatted as TCP packets from TCP layer component 506. IP layer component 514 packages data from TCP layer component 506 into IP packets for transmission across a network. The network may be and/or may include an internet. Analogously, IP layer component 514 interprets data, received from link layer component 512 as IP protocol data and detects IP packets in the received data. IP layer component 514 may strip off IP layer specific data and transfer the payload of one or more IP packets to TCP layer component 506.

In FIG. 5, IP layer component 514 is operatively coupled to TCP layer component 506. TCP layer component 506 is configured to provide a TCP connection over network 606 for sending and/or receiving packets included in the TCP connection between two nodes exemplified by first node 602 and second node 604.

In a TCP connection including first node 602 and second node 604, first node 602 may include a first TCP connection endpoint and second node 604 may include a second TCP connection endpoint. The first and second TCP connection endpoints identify the TCP connection. The TCP connection may have other identifiers, in addition to the included endpoints.

Components of execution environment 502, in an aspect, may interoperate with TCP layer component 506 directly. In another aspect, one or more components, such as network application 504, may interoperate with TCP layer component 506 indirectly. Network application 504 may exchange data with TCP layer component 506 via sockets component 518 and/or an analog of sockets component 518. Alternatively or additionally, network application 504 may communicate with a remote node via an application protocol layer illustrated by application protocol layer component 520. Many application protocols currently exist and new application protocols will be developed. Exemplary application layer protocols include hypertext transfer protocol (HTTP), file transfer protocol (FTP), and extensible messaging and presence protocol (XMPP).

TCP layer component 506 in FIG. 5 may receive data from any of various sources for transmitting in corresponding TCP connections to various corresponding identified TCP connection endpoints in one or more network nodes. FIG. 5 illustrates application in-port (app in-port) component 522 providing an interface component for receiving data to transmit in a TCP connection. FIG. 5 illustrates TCP layer component 506 includes packet generator component 552 configured to package data received by application in-port component 522 for transmitting in one or more TCP packets. The one or more TCP packets are provided to IP layer component 514 via net out-port component 554 exemplifying an output interface component.

Analogously, TCP layer component 506 interprets data received from IP layer component 514 via net in-port component 560. The data is interpreted as TCP data and TCP packets are detected in the received data by net in-port component 560 and/or packet handler component 516. FIG. 5 illustrates TCP layer component 506 includes packet handler component 516 to strip off and/or otherwise process TCP layer specific data. Packet handler component 516 interoperates with application out-port (app out-port) component 524 to transfer data in the TCP packet included in a TCP data stream to sockets component 518, application protocol layer 520, network application 504, and/or other components associated with the local endpoint of the TCP connection. Detailed information on the operation of TCP is included in RFC 793.

With reference to the method illustrated in FIG. 2, block 202 illustrates the method includes receiving, by a first node, first idle information for detecting a first idle time period during which no TCP packet including data in a first data stream sent in the TCP connection by a second node is received by the first node. Accordingly, a system for sharing information for detecting an idle TCP connection includes means for receiving, by a first node, first idle information for detecting a first idle time period during which no TCP packet including data in a first data stream sent in the TCP connection by a second node is received by the first node. For example, as illustrated in FIG. 4a, idle time period policy component 450 is configured for receiving, by a first node, first idle information for detecting a first idle time period during which no TCP packet including data in a first data stream sent in the TCP connection by a second node is received by the first node.

FIG. 5 illustrates idle time period (ITP) policy component 550 as an adaptation of and/or analog of ITP policy component 450 in FIG. 4a. One or more idle time period policy components 550 operate in execution environment 502.

Message 702 in FIG. 7 illustrates a communication including and/or otherwise identifying idle information received by ITP policy component 550. Message 702 may take various forms in various aspects. Exemplary forms for message 702 include a function/method invocation, a message passed via a message queue, data transmitted via a pipe, a message received via a network, and/or a communication via a shared location in IPU memory and/or secondary storage.

Idle information may be received from a configuration storage location for TCP layer component 506 in an IPU memory and/or in secondary storage 108. The configured idle information may be maintained and/or otherwise managed by settings service component 526 configured to maintain and/or manage various options or settings for TCP layer component 506 and/or one or more TCP connections.

In an aspect, network application 504 provides idle information to ITP policy component 550 via settings service component 526 interoperating with sockets component 518. Sockets component 518 and/or TCP layer component 506 may support TCP options applicable globally for some or all TCP connections and/or may support TCP options on a per connection basis. Per connection TCP options may override global TCP options if global options are also supported. In another aspect, idle information may be received from and/or otherwise received based on information via application protocol layer 520, via sockets component 518, and/or directly from network application 504.

Application protocol layer 520 may provide idle information to ITP policy component 550 via settings service component 526 and, optionally, via sockets component 518. Idle information provided by application protocol layer 520 may be based on data received from network application 504, based on a particular configuration of application protocol layer 520, and/or received from a user and/or administrator of one or both of network application 504 and application protocol layer 520.

In an aspect, the idle information received may be based on a previous ITP header identified in a packet in the TCP connection received by first node 602 from second node 604. The previous packet may be received by net in-port component 560. The previous ITP header may be detected by ITP option handler component 562 interoperating with packet handler component 516. Idle information may be identified and/or otherwise determined by ITP option handler component 562. ITP policy component 550 may interoperate with ITP option handler component 562 to receive the idle information.

Idle information received, determined, and/or otherwise identified may include and/or identify a duration of time for detecting an idle time period. The duration may be specified according to various measures of time including seconds, minutes, hours, and/or days.

Alternatively or additionally, idle information may include and/or identify a generator for determining a duration of time for detecting an idle time period. An exemplary generator may include a formula, an expression, a function, a policy, and/or other mechanism for generating and/or otherwise identifying a duration of time.

In an aspect, one or more algorithms for generating a duration of time for detecting an idle time period may be associated with identifiers. The algorithm identifiers may be standardized within a group of nodes including first node 602 and second node 604. The received idle information may include and/or reference an algorithm identifier. First node 602 and second node 604 may each maintain an association between one or more of the algorithm identifiers and a duration generator such as a function and/or a class configured to perform the identified algorithm.

A duration generator may determine the duration of time for detecting an idle time period based on one or more attributes accessible to one or both of first node 602 and second node 604. Exemplary attributes include a measure of network latency, a measure of network congestion, an indication of the availability of a particular resource, a user specified attribute, a security attribute, an energy usage attribute, a user attribute such as role of the user, and/or a measure of bandwidth supported by NIC 508 and/or a physical network medium operatively coupled to NIC 508.

Alternatively or additionally, idle information may include a parameter such as one or more of the attributes identified in the previous paragraph for use in a duration generator for determining a duration of time for measuring and/or otherwise detecting an idle time period.

A TCP connection may be identified by its endpoints. First node 602 and/or second node 604 may include an endpoint of the TCP connection. Alternatively or additionally, first node 602 and/or second node 604 may include a proxy endpoint representing an endpoint in a TCP connection. Nodes, that provide a network address translation (NAT) service, are exemplary nodes including proxy endpoints.

A node including a TCP connection endpoint is referred to as a host. Hosts are typically user devices and/or servers that typically operate at the edge of a network. While endpoints of most TCP connections are not typically included in network nodes for relaying, routing, and/or otherwise forwarding TCP packet data within a network such as routing nodes and switching nodes. Such network nodes may include one or more connection endpoints for one or more respective TCP connections. It should be understood that the term "host" refers to a role played by a device in a network. First node 602 and/or second node 604 may play the role of a host in a TCP connection and/or may be proxy nodes.

A node is referred to as being in or included in a TCP connection when the node includes an endpoint of the connection and/or includes a proxy for a connection endpoint, referred to as a proxy endpoint. A proxy endpoint and an endpoint in a TCP connection may be in the same node or in different nodes.

In FIG. 5, connection state component 558 may maintain state information for one or more TCP connection endpoints and/or proxy endpoints of corresponding TCP connections included in an instance of an execution environment, such as execution environment 502, included in and/or provided by first node 602 or second node 604.

First node 602 and/or second node 604 may play a role of a proxy node for a node including a TCP connection endpoint. First node 602 and/or second node 604 may include a proxy endpoint representing an endpoint in a TCP connection. A proxy node forwards TCP packet data, sent by a host including a TCP connection endpoint, to another host including a corresponding connection endpoint represented by a proxy endpoint included in the proxy node and vice versa. Exemplary proxy nodes in addition to including routing and/or switching capabilities may include a bridge, a hub, a repeater, a gateway, and a firewall.

In an aspect, a TCP keep-alive option, a TCP user timeout, a retransmission timeout, an acknowledgment timeout, and/or another timeout associated with a TCP connection may be modified based on the first idle information.

For example, in FIG. 5, ITP policy component 550 operating in first node 602 may modify an attribute of a TCP keep-alive option provided by one or more keep-alive components that may include settings service component 526. Modifying a keep-alive attribute may include creating the attribute, deleting the attribute, and/or modifying the attribute. ITP policy component 550 may interoperate with settings service component 526, connection state component 558, and/or a keep-alive option handler component (not shown) to detect the existence and state of one or more keep-alive attributes in determining whether a keep-alive option is active and/or in identifying its current state.

In response to identifying the idle information, ITP policy component 550 may activate, disable, and/or modify the state of the keep-alive option via interoperation with one or more of settings service component 526, connection state component 558, and/or a keep-alive option handler. Thus, in response to identifying the idle information, ITP policy component 550 may prevent and/or alter the time a keep-alive packet is sent to second node 604 from first node 602.

Alternatively or additionally, ITP policy component 550 operating in first node 602 may modify an attribute associated with an acknowledgment timeout configured for TCP layer component 506. Modifying an acknowledgment timeout attribute may include creating the attribute, deleting the attribute, and/or modifying the attribute. ITP policy component 550 may interoperate with settings service component 526, connection state component 558, and/or an acknowledgment option handler component (not shown) to detect the existence and state of one or more packet acknowledgment attributes. In response to identifying the idle information, ITP policy component 550 may modify the state of the packet acknowledgment option. Thus, in response to identifying the idle information, ITP policy component 550 may prevent and/or alter the time an acknowledgment is sent in a packet in a TCP connection.

Returning to FIG. 2, block 204 illustrates the method further includes generating a TCP packet including a first idle time period header identifying metadata for the first idle time period based on the first idle information. Accordingly, a system for sharing information for detecting an idle TCP connection includes means for generating a TCP packet including a first idle time period header identifying metadata for the first idle time period based on the first idle information. For example, as illustrated in FIG. 4*a*, packet generator component 452 is configured for generating a TCP packet including a first idle time period header identifying metadata for the first idle time period based on the first idle information.

FIG. 5 illustrates packet generator component 552 as an adaptation of and/or analog of packet generator component 452 in FIG. 4*a*. One or more packet generator components 552 operate in execution environment 502.

Packet generator component 552 in FIG. 5 may receive idle information and/or information based on the received idle information from ITP policy component 550. Whether and when packet generator component 552 receives information for including an idle time period (ITP) header in a TCP packet may depend on a current state of the associated TCP connection. In FIG. 5, ITP policy component 550 may interoperate with connection state component 558 to determine whether and when to provide information to packet generator component 552 for including an ITP header in a TCP packet.

In an aspect, an ITP header may be included in a packet exchanged during setup of TCP connection. RFC 793 describes a "three-way handshake" for establishing a TCP connection. The synchronization requires each side to send it's own initial sequence number and to receive a confirmation of it in acknowledgment from the other side. Each side must also receive the other side's initial sequence number and send a confirming acknowledgment.

1) A-->B SYN my sequence number is X
2) A<--B ACK your sequence number is X
3) A<--B SYN my sequence number is Y
4) A-->B ACK your sequence number is Y Because steps 2 and 3 can be combined in a single message this is called the three way (or three message) handshake.

Other message exchanges may be used in setting up a TCP connection as those skilled in the art will understand. Such other exchanges are not currently supported by the TCP as described in RFC 793. The specified "three-way handshake" and other patterns of message exchange for setting up a TCP connection include packets that are considered to be in the TCP connection for purposes of this disclosure. Including an ITP header may be restricted to packets exchanged in connection setup, excluded from packets exchanged during connection establishment, or allowed in one or more packets exchanged during connection establishments and in packets exchanged after connection setup.

In an aspect, when connection state component 558 and/or ITP policy component 550 determine an ITP header should be included in a TCP packet based on received idle information, packet generator component 552 may include the ITP header in a next TCP packet generated in response to data received via application in-port component 522 for sending to first node 602. In another aspect, packet generator component 552 may send the ITP header in a TCP packet in the TCP connection with no data included in the TCP data stream sent by first node 602 to second node 604. Such a packet is referred to as an empty Packet generator component 554 may send the empty TCP packet when TCP layer component 506 has no for data from an application in second node 604 to send in the TCP data stream to first node 602.

Figure 8:
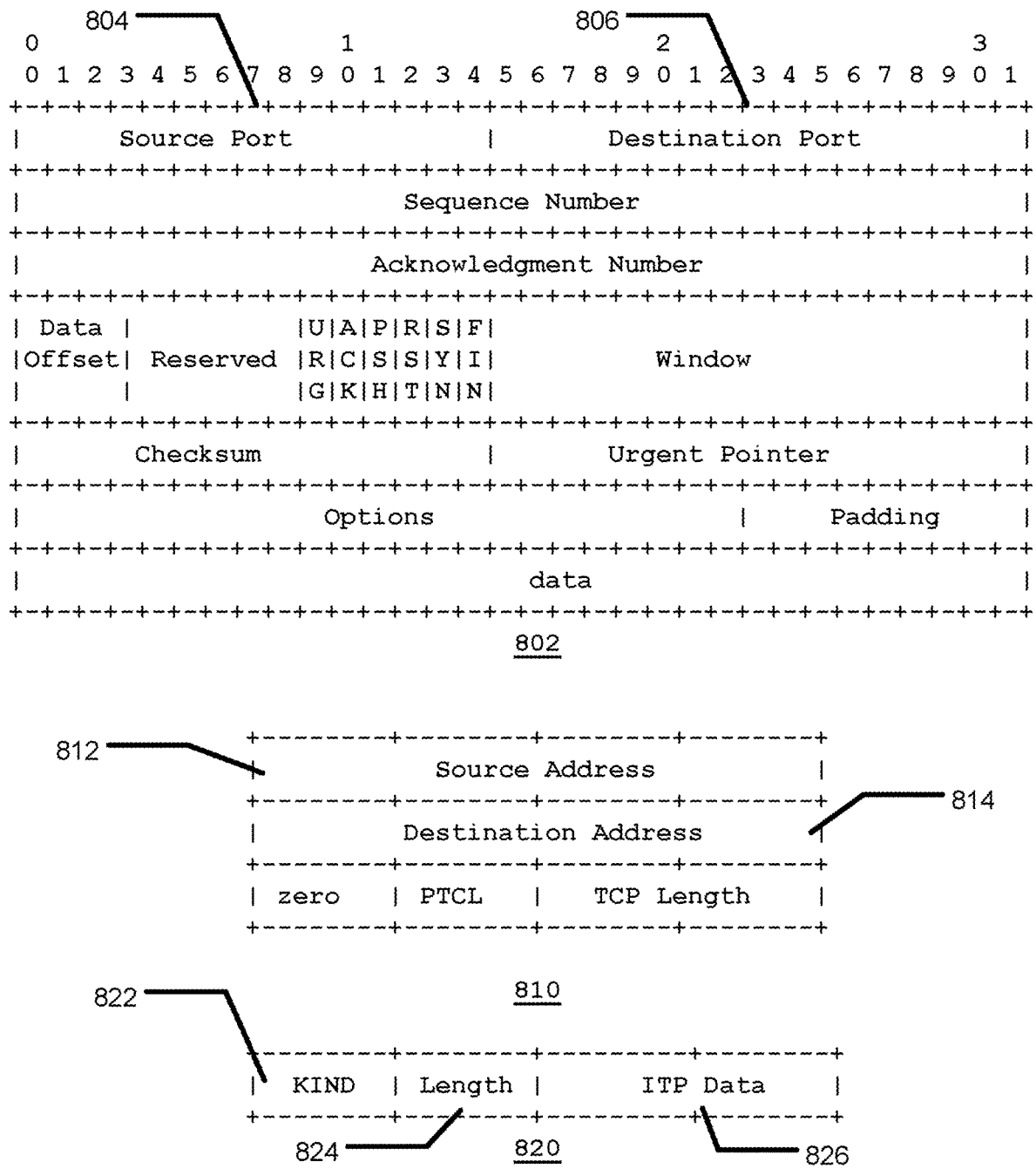
FIG. 8 is a diagram illustrating a structure for a packet transmitted via a network according to an aspect of the subject matter described herein.

Packet generator component 552 may generate a packet according to the TCP specifications and may include a header identified as an ITP header in accordance with specifications for including TCP option headers in a TCP packet. See RFC 793 for more details. FIG. 8 illustrates a format or structure for a TCP packet 802 as described in RFC 793. Each "+" character in FIG. 8, indicates a bit-boundary. TCP packet 802 specifies a location and format for including a source port 804 portion including an identifier for an endpoint of the TCP connection for a sending node and a destination port 806 including an identifier for a corresponding endpoint of the TCP connection in a receiving node. IP packet 810 illustrates a format for an IP packet header for an IP packet including TCP packet data. Source address 812 specifies a location and format in an IP header for including a network address identifying a network interface of the sending node, and destination address 814 identifying a network interface for the receiving node. A network address and a port number identify a connection endpoint in a network. Two endpoints identify a TCP connection.

FIG. 8 also illustrates a format for an exemplary ITP header 820. A KIND location is specified for including an identifier indicating that the option is an idle time period (ITP) option in an ITP header. Identifiers for option headers are currently under the control of the Internet Assigned Numbers Authority (IANA). Length field 824 identifies a length of an ITP header. An ITP data field 826 is specified for including ITP header information for detecting an idle time period as described herein Those skilled in the art will recognize given this disclosure that an ITP header may have other suitable formats and may be included in a TCP packet in structures and locations other than those specified for TCP options in RFC 793. An equivalent or analog of an ITP header may be included in a footer of a protocol packet in an extension and/or variant of the current TCP.

ITP data field 826 in FIG. 8 may include and/or otherwise identify metadata for the first idle time period. For example, an ITP data field in a packet may include and/or otherwise identify one or more of a duration of time for detecting an idle time period, a duration generator for determining a duration of time for detecting an idle time period, and a parameter for use in a duration generator for determining a duration of time for measuring and detecting an idle time period.

Message 704 in FIG. 7 illustrates an invocation and/or other access to packet generator component 552 for generating a TCP packet including an ITP header based on received idle information.

Returning to FIG. 2, block 206 illustrates the method further includes sending the TCP packet in the TCP connection to the second node to provide the metadata for the first idle time period to the second node. Accordingly, a system for sharing information for detecting an idle TCP connection further includes means for sending the TCP packet in the TCP connection to the second node to provide the metadata for the first idle time period to the second node. For example, as illustrated in FIG. 4a, the net out-port component 454 is configured for sending the TCP packet in the TCP connection to the second node to provide the metadata for the first idle time period to the second node.

FIG. 5 illustrates net out-port component 554 as an adaptation of and/or analog of net out-port component 454 in FIG. 4a. One or more net out-port components 554 operate in execution environment 502. Net out-port component 554 is illustrated operatively coupled to packet generator component 552. Net out-port component 554 may receive TCP packet data from packet generator component 552 and interoperate with IP layer component 514 to send the TCP packet in one or more IP packets via network 606 to second node 604. Message 706.1 in FIG. 7 illustrates a TCP packet including an ITP header sent by first node 602 and received by second node 604.

In one aspect, an ITP header may be sent to make sending one or more TCP keep-alive packets by a partner node in the connection unnecessary. A receiver of a packet including an ITP header, such as second node 604, may keep a TCP connection alive based on information in the ITP header.

In another aspect, first node 602 may set a keep-alive timeout attribute based on a duration of the first idle time period identified in the first idle information and/or in the metadata provided to second node 604. For example, first node 602 may monitor a time period during which no non-empty packets are sent or received in the TCP connection. A keep-alive option handler and/or keep-alive component (not shown) operating in first node 602 may set a keep-alive timer according to the timeout attribute, with a duration that will result in the keep-alive timer expiring before an idle time period can occur. In response to detecting a keep-alive timeout, which may be indicated by the expiration of the keep-alive timer, the keep-alive option handler and/or keep-alive policy component may provide information to packet generator component 552 to generate a TCP keep-alive packet. The packet generator component 552 may provide the generated packet to net out-port component 554 for sending the TCP keep-alive packet to second node 604 to determine whether the TCP connection is active and/or to keep the TCP connection active.

In another aspect, ITP policy component 550 operating in first node 602 may set a timer, analogous to the keep-alive timer described in the previous paragraph that expires before an time period can occur. In response the timer expiring, ITP policy component 550 may provide idle information to packet generator component 552 to generate a TCP packet including a second ITP header. Content of the second ITP header may be based on the first idle information received, data received from second node 604, information received from a network application that may be from a user, and/or on any information accessible to TCP layer component 506 in execution environment 502 in first node 602. The TCP packet generated by packet generator component 552 is provided to IP layer component 514 via net out-port component 554 to send to second node 604 in the TCP connection. Along with sending the message, first node 602 may reset and/or otherwise restart detection of the first idle time period. Thus, a second ITP header may be sent in a second TCP packet by first node 602 to second node 602 along with restarting detection of the first idle time period. Alternatively, first node 602 may reset and initiate detection of an idle time period with a different duration than the previous idle time period, based on the idle information for generating the second ITP header.

Returning to FIG. 2, block 208 illustrates the method further includes detecting the first idle time period based on the first idle information. Accordingly, a system for sharing information for detecting an idle TCP connection further includes means for detecting the first idle time period based on the first idle information. For example, as illustrated in FIG. 4a, the idle time period monitor component 456 is configured for idle time period monitor.

FIG. 5 illustrates idle time period monitor component 556 as an adaptation of and/or analog of idle time period monitor component 456 in FIG. 4a. One or more idle time period monitor components 556 operate in execution environment 502.

In an aspect, in response to receiving the first idle information, ITP policy component 550 may store a value representing a duration of time in a configuration storage location. Alternatively, or additionally, ITP policy component 550 may invoke a duration generator to determine a duration of time for detecting the idle time period. The duration generator may be preconfigured for the TCP connection and/or may be identified based on the idle information received. As described, the invoked generator may be invoked with a parameter included in and/or otherwise identified based on the received idle information.

ITP policy component 550 may interoperate with ITP monitor component 556 to identify the duration for detecting the idle time period. ITP monitor component 556, in various aspects, may receive information including and/or otherwise identifying a duration of time, a duration generator, and/or a parameter for a duration generator. ITP monitor component 556 may initiate and/or restart a process for detecting an idle time period. In an aspect, ITP monitor component 556 detects and/or otherwise identifies a beginning of a potential idle time period based on one or more specified events.

In an aspect, detecting the first idle time period by ITP monitor component 556 may include detecting a time period in the idle time period during which first node 602 has received acknowledgment for all data sent via the TCP connection in the TCP data stream by first node 602 to second node 604. Further, the first idle time period may include a time period during which first node 602 has sent one or more TCP packets to second node 604 to acknowledge all data received in a TCP data stream in the TCP connection from second node 604 to first node 602. Detecting the first idle time period by ITP monitor component 556 may include detecting that all received data has been acknowledged and/or that all sent data has been acknowledged.

In an aspect, ITP policy component 550 may include a policy with a rule indicating that an idle time period cannot begin while a TCP packet sent by first node 602 remains unacknowledged by second node 604. ITP policy component 550 may prevent ITP monitor component 556 from initiating detection of an idle time period while unacknowledged data exists. In a further aspect, a time duration may be associated and/or included in the policy identifying a limit to a period of waiting to receive acknowledgment of TCP packet data sent by first node 602. In one aspect, waiting for lack of an acknowledgment for an empty packet does not delay detection of an idle time period, while in another aspect ITP monitor component 556 will not initiate detection while an empty packet remains unacknowledged.

In an aspect, idle information, received by a node may be included in and/or otherwise based on a previous idle time period header identified in a previous TCP packet received in the TCP connection by the node from a remote node prior to sending an ITP header based on the idle information by the node. For example, the first idle information received by ITP policy component 550 in first node 602 may be based on an idle time period header included a TCP packet in the TCP connection sent by second node 604 and received by first node 602 prior to sending the first TCP packet by first node 602. The exchange of ITP headers may include a negotiation between first node 602 and second node 604.

A duration of time may be identified based on the idle information received by ITP policy component in first node 602. A timer may be set according to the identified duration. Detecting the first idle time period may include and/or otherwise may be based on detecting the timer expiration. ITP monitor component 556 may set a timer configured to expire in a time duration identified based on the first idle information received by ITP policy component 550. The identified duration may be longer, shorter, or equal to a duration of the idle time period. ITP monitor component 556 may use multiple timers. ITP monitor component 556 may recalculate and/or otherwise generate a new idle duration based on the idle information at one or more times during detection of the first idle time period. That is, a duration of an idle time period may be static and/or may be dynamic, changing based on attribute information accessible during the detection process and/or based on one or more duration generators.

Message 710.1 illustrates a call and/or other communication between ITP monitor component 556 and a timer component in first node 602 to set a timer included in detecting an idle time period. Prior to the setting the timer, first node 602 and second node 602 may be active in exchanging TCP packets as illustrated by messages including message 706.2 through message 706.*n*. Those skilled in the art will recognize that detection of an idle time period may not include explicitly and/or directly using a timer. ITP monitor component 556 may monitor other events as a proxy or indirect mechanism for initiating detection and detecting an idle time period.

ITP monitor component 556 may detect one or more events configured to indicate that an idle time period has occurred. For example, expiration of a timer or multiple associated timers may be interpreted by ITP monitor component 556 as marking an occurrence of the first idle time period. Message 710.2 illustrates ITP monitor component 556 receiving information identifying expiration of a timer for detecting the first idle time period.

In a further aspect, in response to detecting the expiration of a timer set as described above, a TCP keep-alive packet may be sent by first node 602 to determine whether the TCP connection is action and/or to keep the TCP connection active. When the keep-alive packet is sent, an acknowledgment timer may be set. If a timeout of the acknowledgment timer is detected indicating no TCP packet has been received acknowledging the keep-alive packet, the first idle time period may be detected in response to and/or otherwise based on the timeout of the acknowledgment timer.

In FIG. 5, ITP policy component 550 in first node 602 may provide a duration identified based on the received idle information to a keep-alive monitor component (not shown). The keep-alive monitor component may configure a keep-alive timer to expire based on the identified duration. In response to detecting expiration of the keep-alive timer, ITP monitor component 556 may invoke packet generator component 552 to generate a TCP keep-alive packet. First node 602 may send the TCP packet to second node 604. The TCP keep-alive packet may be sent to prevent detection of an idle time period by second node 604 and/or may otherwise be sent to detect by first node 602 whether the TCP connection is active.

First node 602 may set an acknowledgment timer associated with sending the packet. If the acknowledgment timer expires before a TCP packet is received from second node 602 acknowledging the packet sent, ITP monitor component 556 may detect the idle time period in response to and/or otherwise based on expiration of the acknowledgment timer.

Receiving a packet from second node 604 included in the TCP connection is an event that, in various aspects, may directly and/or indirectly indicate the beginning of a potential idle time period. A potential idle time period may begin at some specified point during and/or after processing a received TCP packet. In one aspect, an empty TCP packet may be received while a potential idle time period is being monitored. That is, a beginning of the potential idle time period has been detected. In response to receiving the empty TCP packet, monitoring of the current potential time period may be aborted. Further, in response to receiving the empty TCP packet, a beginning of a next potential idle time period may be detected.

In FIG. 5, ITP policy component 550 and ITP monitor component 556 may operate to reset and/or initiate detection of an idle time period in response to receiving an empty TCP packet. First node 602 may receive an empty packet. In response, ITP monitor component 556 may receive an event and/or other indication to reset detection of an idle time period. Resetting the detecting process may be based on whether or not a received empty TCP packet matches a specified condition. ITP option handler component 562 may be configured to determine whether a received empty TCP packet matches the condition. If ITP option handler component 562 determines the empty packet matches the condition, ITP monitor component 556 may be instructed to reset and/or restart detection of the first idle time period including detecting the beginning of a next potential time period.

The condition may match received TCP packets including ITP headers and/or other TCP option headers. A condition may match a port number and/or other field in TCP packet. A condition may further be based on a network address in an IP header including the TCP packet.

In a further aspect, first node 602 may receive via network 606 from second node 604 a TCP packet in the TCP connection including an second ITP header. Message 706.2 in FIG. 7 illustrates the TCP packet sent by second node 604. ITP option handler component 562 may identify the second ITP header received from second node 604. The identified second ITP header may be for detecting by first node 602 an idle time period, during which no TCP packet in the TCP connection is received, by the first node 602 that includes data in the first TCP data stream from second node 604. The first idle time period may be detected by ITP monitor component 556 in first node 602 based on the second ITP header and based on the received idle information. The second ITP header received in the TCP packet from second node 604 may be based on the first ITP header in the TCP packet sent in the TCP connection by first node 602 to second node 604.

In some aspects, the first node and second node 604 may continue to exchange ITP headers. Information in the exchanged ITP headers may be based on ITP headers received in the TCP connection and/or on data accessible locally to one or both of the nodes. In some aspects, the exchange may be a negotiation while in other the exchange may simply be informational.

Returning to FIG. 2, block 210 illustrates the method further includes deactivating the TCP connection in response to detecting the first idle time period. Accordingly, a system for sharing information for detecting an idle TCP connection further includes means for deactivating the TCP connection in response to detecting the first idle time period. For example, as illustrated in FIG. 4a, the connection state component 458 is configured for deactivating the TCP connection in response to detecting the first idle time period.

FIG. 5 illustrates connection state component 558 as an adaptation of and/or analog of connection state component 458 in FIG. 4a. One or more connection state components 558 operate in execution environment 502.

When ITP monitor component 556 in first node 602 detects an idle time period, ITP monitor component 556 may provide an indication to connection state component 558. The indication may indicate that the idle time period for the TCP connection has been detected and/or otherwise may instruct connection state component 558 and/or other components in TCP layer component 506 to deactivate the TCP connection. Message 712 in FIG. 7 illustrates a communication to deactivate the TCP connection communicated in response to detecting the idle time period.

Deactivating the TCP connection may include closing the TCP connection. A TCP connection may be closed using a three-way handshake packet exchange described in RFC 793. Deactivating the TCP connection may include sending a TCP packet by the detecting node to reset the TCP connection. According to RFC 793, first node 602 may send a TCP packet including a reset (RST) bit set to "1" to indicate a connection reset. Deactivating the TCP connection may include, alternatively or additionally, releasing a resource allocated for maintaining and/or activating the TCP connection.

With respect to the method illustrated in FIG. 3, block 302 illustrates the method includes receiving, by a second node from a first node, a first transmission control protocol (TCP) packet in a TCP connection. Accordingly, a system for sharing information for detecting an idle TCP connection includes means for receiving, by a second node from a first node, a first transmission control protocol (TCP) packet in a TCP connection. For example, as illustrated in FIG. 4b, the net in-port component 460 is configured for receiving, by a second node from a first node, a first transmission control protocol (TCP) packet in a TCP connection.

FIG. 5 illustrates net in-port component 560 as an adaptation of and/or analog of net in-port component 460 in FIG. 4b. One or more net in-port components 560 operate in execution environment 502.

As described above, net in-port component 560 in FIG. 5 may operate in an instance of execution environment 502 and/or an analog included in and/or including second node 604. The TCP packet, illustrated by message 706.1 in FIG. 7 and described above, may be received by net in-port component 560 in second node 604. The TCP packet may include data in a second TCP data stream sent by first node 602 to second node 604 to deliver to a user of TCP layer component 506 in second node 604 such as network application 504. Alternatively, the TCP packet may be an empty TCP packet. The received TCP packet may be a packet included in setting up the TCP connection as described above.

Returning to FIG. 3, block 304 illustrates the method further includes detecting a first idle time period header, in the first packet, identifying metadata for a first idle time period, detectable by the first node, during which no TCP packet including data in a first TCP data stream sent in the TCP connection by the second node is received by the first node. Accordingly, a system for sharing information for detecting an idle TCP connection includes means for detecting a first idle time period header, in the first packet, identifying metadata for a first idle time period, detectable by the first node, during which no TCP packet including data in a first TCP data stream sent in the TCP connection by the second node is received by the first node. For example, as illustrated in FIG. 4b, idle time period option handler component 462 is configured for detecting a first idle time period header, in the first packet, identifying metadata for a first idle time period, detectable by the first node, during which no TCP packet including data in a first TCP data stream sent in the TCP connection by the second node is received by the first node.

FIG. 5 illustrates idle time period option handler component 562 as an adaptation of and/or analog of idle time period option handler component 462 in FIG. 4b. One or more idle time period option handler components 562 operate in execution environment 502.

In FIG. 5, ITP option handler component 562 is operatively coupled to packet handler component 516 The TCP packet, including the ITP header sent by first node 602, may be received, and identified as a TCP packet by net in-port component 560 operating in second node 604. As illustrated in FIG. 5, net in-port component 560 and/or an analog of net in-port component 560 may provide and/or otherwise identify the received packet to packet handler component 516. Packet handler component 516 may detect various portions of the TCP packet according to the TPC packet 802 structure as illustrated in FIG. 8. Alternatively, packet handler component 516 may provide some or all of the packet to various components in TCP layer component 506 to identify portions of the packet according to the TCP specification and/or according to a particular implementation.

The ITP header sent by first node 602 may be received by and/or otherwise identified by ITP option handler component 562. Message 708 in FIG. 7 exemplifies activation of ITP option handler component 562 for detecting the ITP header in the TCP packet received from first node 602 by second node 604.

In various aspects, ITP option handler component 562 operating in second node 604 may detect and/or otherwise determine a duration of time for associated with detection of the idle time period by first node 602, a duration generator, and/or a parameter for a duration generator. The first idle time period header may identify metadata including and/or identifying for detection of the first idle time period by first node 602 a duration of time, a generator for determining a duration of time, and/or an input for determining a duration of time.

Returning to FIG. 3, block 306 illustrates the method yet further includes modifying, based on the metadata, by the second node a timeout attribute associated with the TCP connection. Accordingly, a system for sharing information for detecting an idle TCP connection includes means for modifying, based on the metadata, by the second node a timeout attribute associated with the TCP connection. For example, as illustrated in FIG. 4b, the option attribute handler component 464 is configured for modifying, based on the metadata, by the second node a timeout attribute associated with the TCP connection.

FIG. 5 illustrates option attribute handler component 564 as an adaptation of and/or analog of option attribute handler component 464 in FIG. 4b. One or more option attribute handler components 564 operate in execution environment 502.

In an aspect, ITP option handler component 562 may one or more attribute option handler components 564 to modify one or more corresponding attributes of a keep-alive option, a TCP user timeout, a retransmission timeout, an acknowledgment timeout, and another timeout associated with the TCP connection, in response to identifying the ITP header. The modifying may be based on the content of the ITP header.

For example, ITP option handler component 562 in second node 604 may interoperate with a keep-alive attribute option handler component 564 directly and/or indirectly via settings service component 526, connection state component 558, and/or a keep-alive policy component (not shown) to detect the existence and state of one or more keep-alive attributes in determining whether the keep-alive option is active and/or the state of the keep-alive option.

In response to identifying the idle time period header, ITP option handler component 562 may activate, disable, and/or modify the state of the keep-alive option via interoperation with the keep-alive attribute option handler. Thus, in response to identifying the idle information, attribute option handler component 564 may prevent and/or alter the time a keep-alive packet is sent by second node 604 to first node 602.

Alternatively or additionally, an attribute option handler component 564 may modify an attribute associated with a packet acknowledgment option provided by TCP layer component 506 in first node 602. Modifying a packet acknowledgment attribute may include creating the attribute, deleting the attribute, and/or modifying the attribute. Attribute option handler component 564 may interoperate with settings service component 526, connection state component 558, and/or an acknowledgment policy component (not shown) to detect the existence and state of one or more packet acknowledgment attributes. In response to identifying the idle information, attribute option handler component 564 may modify the state of the packet acknowledgment option. Thus, in response to identifying the idle information, attribute option handler component 564 may prevent and/or alter the time an acknowledgment is sent in a packet data from second node 604 to first node 602 in the TCP connection.

As described herein an ITP header for detecting an idle time period for a TCP connection may serve a number of purposes. A first node in a TCP connection may via an ITP header inform and/or otherwise identify to a second node in the connection one or more durations for detecting an idle time period by one or both nodes. Given multiple purposes, one or more types of ITP headers may be supported and/or an ITP header may be structured to support one or more of the described services. An exchange of ITP headers may be informational and/or may be included in negotiation between two nodes included in a TCP connection. When used in a negotiation, an ITP header may be included in a negotiation protocol that has an identifiable end during a portion of the existence of a TCP connection or may be included in a negotiation that may remain ongoing throughout the existence of a TCP connection. Those skilled in the art will recognize the list of services in this paragraph is not exhaustive.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction processing units, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used herein, a "computer readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer readable medium and execute the instructions for carrying out the described methods. A non-exhaustive list of conventional exemplary computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating any non-claimed element is essential to the practice of the subject matter as claimed.

I claim:

1. An apparatus, comprising:
a non-transitory memory storing instructions; and
one or more processors in communication with the non-transitory memory, wherein the one or more processors execute the instructions to:
identify, at the apparatus, first information on which at least a first duration for detecting a first type of time period is based, the first type of time period being started in response to detecting at least one of a received packet or a sent packet;
allocate a resource for a first connection;
generate a first packet including a first parameter field identifying first metadata for use in determining a second duration for detecting the first type of time period, the first packet for use in a protocol that is different from a transmission control protocol (TCP);
set up the first connection, by sending, from the apparatus to a node, the first packet to provide the first metadata to the node, for use by the node in determining the second duration for detecting the first type of time period;
in response to detecting, based on the first duration and an absence of one or more packets and by the apparatus during at least a portion of the first connection including at least a portion of the first connection set up, a first time period of the first type of time period, at least partially close the first connection, by releasing, by the apparatus, the resource allocated for the first connection;
in response to detecting, based on the second duration and an absence of at least one packet and by the apparatus after the first connection set up and a use of the first duration is changed to a use of the second duration, a second time period of the first type of time period, at least partially close the first connection, by releasing, by the apparatus, the resource allocated for the first connection, such that, during the second time period of the first type of time period, a packet including no application data is capable of being sent or received without a second time period timer being reset; and
in response to detecting, based on a third duration, a third time period of a second type of time period that is detected based on one or more criteria that is different from that on which detection of the first time period and the second time period of the first type of time period are based, perform at least one action, where the third duration is determined based on a first algorithm that is different from a second algorithm on which a determination of the second duration is based.

2. The apparatus of claim 1, wherein the apparatus is configured such that the first duration is not negotiated between the apparatus and the node during the first connection set up, and the second duration is negotiated between apparatus and the node during the first connection set up for the first connection.

3. The apparatus of claim 1, wherein the apparatus is configured such that the first duration is not negotiated during the first connection set up between the apparatus and the node for the first connection, and the second duration is negotiated between the apparatus and the node for the first connection.

4. The apparatus of claim 1, wherein the apparatus is configured such that the first time period is only capable of being detected during the first connection set up.

5. The apparatus of claim 1, wherein the apparatus is configured such that the packet including no application data is capable of being sent or received with the second time period timer being started, and, thereafter, the packet including no application data is capable of being sent or received without the second time period timer being reset.

6. The apparatus of claim 1, wherein the apparatus is configured such that the first duration is used and the second duration is not used, for detecting the first type of time period until the use of the first duration is changed to the use of the second duration.

7. The apparatus of claim 1, wherein the apparatus is configured such that the apparatus is a client, the packet including no application data is capable of being sent, and the second time period timer is of the client, for use in detecting another instance of the second time period at the client.

8. The apparatus of claim 1, wherein the apparatus is a server and the node is a client, the packet including no application data is capable of being received, and the second time period timer is of the client, for use in detecting the second time period at the client.

9. The apparatus of claim 1, wherein the apparatus is configured such that the second duration is capable of being different from the first duration.

10. The apparatus of claim 9, wherein the apparatus is configured such that the second duration is different from the first duration.

11. The apparatus of claim 9, wherein the apparatus is configured such that the second duration is the same as the first duration, despite being capable of being different from the first duration.

12. The apparatus of claim 1, wherein the apparatus is configured such that:
the first packet is not a synchronize (SYN) packet;

the first connection is not a Transmission Control Protocol (TCP) extension connection, and the first connection is not a TCP extension connection that involves a TCP extension; and the first type of time period does not include a user timeout period.

13. The apparatus of claim 1, wherein the apparatus is configured such that an idle timeout attribute is utilized for the first type of time period, and a user timeout attribute, that is separate from the idle timeout attribute, is utilized for controlling communication of one or more acknowledgment packets.

14. The apparatus of claim 1, wherein the apparatus is configured such that the first type of time period is started in response to the received packet.

15. The apparatus of claim 1, wherein the apparatus is configured such that the first type of time period is started in response to the sent packet.

16. The apparatus of claim 1, wherein the apparatus is configured such that, after the first connection set up, the detection of the second time period of the first type of time period is based on the second duration, by being only based on whether, for the second duration after the second time period of the first type of time period is started, no packet is received and processed to keep the first connection active.

17. The apparatus of claim 1, wherein the apparatus is configured such that the first connection is not a Transmission Control Protocol (TCP) extension connection, and the first connection is not a TCP extension connection that involves a TCP extension.

18. The apparatus of claim 1, wherein the apparatus is configured such that:
the third time period of the second type of time period:
includes an acknowledgment (ACK) time period, and
is configured such that the one or more criteria requires that the third time period of the second type of time period is started based on an ACK-eliciting packet being sent, and is detected based on an absence of a received ACK packet,
where the at least one action does not include connection closure; and
the first and second time periods of the first type of time period:
do not include an ACK time period,
where the absence of one or more packets and the absence of at least one packet each include the absence of a received packet type that is not limited to a received ACK packet type.

19. The apparatus of claim 1, wherein the apparatus is configured such that the at least one action includes restarting an apparatus timer utilized to detect the third time period.

20. The apparatus of claim 1, wherein the apparatus is configured such that the at least one action includes restarting an apparatus timer of the apparatus utilized to detect the third time period that is the same as the second time period timer which is utilized to detect the second time period.

21. The apparatus of claim 1, wherein the apparatus is configured such that the at least one action includes restarting an apparatus timer of the apparatus utilized to detect the third time period that is different from the second time period timer which is utilized to detect the second time period.

22. The apparatus of claim 1, wherein the apparatus is configured such that the at least one action includes affecting an apparatus timer utilized to detect the second type of time period.

23. The apparatus of claim 1, wherein the apparatus is configured such that the at least one action does not include connection closure.

24. The apparatus of claim 1, wherein the apparatus is configured such that the at least one action includes sending a signal.

25. The apparatus of claim 1, wherein the apparatus is configured such that the third time period is detected based on the third duration, by being detected when no acknowledgement packet is received by the apparatus in the first connection and processed as an acknowledgement, during the third duration, for a sent packet sent by the apparatus in the first connection.

26. The apparatus of claim 20, wherein the apparatus is configured such that the third time period is detected based on the third duration, when an acknowledgement packet is received by the apparatus in the first connection and processed as an acknowledgement, during the third duration, for at least one other sent packet sent by the apparatus in the first connection.

27. The apparatus of claim 1, wherein the apparatus is configured such that the third time period is detected based on the third duration, by being detected when an expected acknowledgement packet is not received by the apparatus in the first connection, during the third duration, for a sent packet sent by the apparatus in the first connection.

28. The apparatus of claim 1, wherein the apparatus is configured such that the third time period is detected only in response to an acknowledgement packet not being received, for the third duration, in the first connection for a sent packet sent in the first connection.

29. The apparatus of claim 1, wherein the apparatus is configured such that the third time period is detected on a sent packet-by-sent packet basis, in response to no acknowledgement packet being received in the first connection and processed as an acknowledgement for a particular sent packet sent in the first connection.

30. The apparatus of claim 1, wherein the apparatus is configured such that the first packet also includes some data, separate from the first metadata, for use in determining the third time period.

31. The apparatus of claim 1, wherein the apparatus is configured such that the third time period is detected utilizing another timer that is not utilized to detect the first time period nor the second time period.

32. The apparatus of claim 1, wherein the apparatus is configured such that at least one aspect of the third duration of the third time period is negotiated, via a metadata negotiation, during the first connection set up between the apparatus and the node for the first connection.

33. The apparatus of claim 1, wherein the apparatus is configured such that the third time period is an acknowledgment timeout period during which an expected acknowledgment for a sent packet is not received.

34. The apparatus of claim 1, wherein the apparatus is configured such that the third time period is an acknowledgement timeout.

35. The apparatus of claim 1, wherein the apparatus is configured such that the second duration is determined based on the third duration.

36. The apparatus of claim 1, wherein the apparatus is configured such that the third duration is determined based on the second duration.

37. The apparatus of claim 1, wherein the apparatus is configured such that the third time period is detected based on the third duration, by being detected when no acknowledgement packet is detected, by the apparatus during the third duration, as being received and processed as an acknowledgement in the first connection to acknowledge a sent packet of a plurality of sent packets sent by the apparatus, where the third duration starts for each of the plurality of sent packets when at least one of the plurality of sent packets is sent, and where a single timer and a single timeout variable are utilized for detecting the third time period in connection with the plurality of sent packets.

38. The apparatus of claim 1, wherein the apparatus is configured such that the third duration is determined using an other parameter field identifying second metadata, where the other parameter field is communicated during the first connection set up.

39. The apparatus of claim 1, wherein the apparatus is configured such that the third duration is determined using an other parameter field identifying second metadata, where the other parameter field is communicated in the first connection after the first connection set up.

40. The apparatus of claim 1, wherein the apparatus is configured such that the protocol supports HyperText Transfer Protocol (HTTP) protocol for transporting at least some application data therewith.

41. The apparatus of claim 1, wherein the apparatus is configured such that the one or more packets is of the same type as the at least one packet.

42. The apparatus of claim 1, wherein the apparatus is configured such that the one or more packets and the at least one packet include all packet types.

43. The apparatus of claim 1, wherein the apparatus is configured such that the one or more packets and the at least one packet include all packet types of received packets.

44. The apparatus of claim 1, wherein the apparatus is configured such that the packet including no application data includes an empty packet.

45. The apparatus of claim 1, wherein the apparatus is configured such that the one or more packets and the at least one packet include one or more received packets.

46. The apparatus of claim 1, wherein the apparatus is configured such that the one or more packets and the at least one packet include a plurality of packet types of received packets.

47. The apparatus of claim 1, wherein the apparatus is configured such that the one or more packets and the at least one packet include one or more sent packets.

48. The apparatus of claim 1, wherein the apparatus is configured such that, while an attempt is being made to detect at least one of the first time period or the second time period, at least one of the absence of at least one packet or the absence of one or more packets is capable of being detected in all possible disconnection scenarios.

49. The apparatus of claim 1, wherein the apparatus is configured such that an attempt to detect at least one of the absence of at least one packet or the absence of one or more packets, is made during operation in all possible disconnection scenarios.

50. The apparatus of claim 1, wherein the apparatus is configured such that at least one of the absence of at least one packet or the absence of one or more packets is capable of being detected in all operational scenarios.

51. The apparatus of claim 1, wherein the apparatus is configured such that at least one of the absence of at least one packet or the absence of one or more packets is detected in a set of operational scenarios not limited to a specific scenario involving a specific disconnection event.

52. The apparatus of claim 1, wherein the apparatus is configured such that at least one of the absence of at least one packet or the absence of one or more packets is detected in a set of operational scenarios not limited to specific scenarios involving only a subset of possible disconnection events.

53. The apparatus of claim 1, wherein at least one of:
the apparatus is also a node;
the apparatus is another node;
the apparatus includes another node;
the at least one action includes at least partial closure of the first connection;
the at least one action includes a closure of the first connection;
the at least one action does not include a closure of the first connection;
the at least one action does not include any part of a closure of the first connection;
the apparatus includes a particular node;
the apparatus includes a device, including a network interface, that is a component of the apparatus;
the apparatus includes a network interface that is a component of the apparatus;
the apparatus includes a web server;
the timer includes a hardware timer;
the timer includes a software timer;
the by the apparatus includes caused, at least in part, by the apparatus;
the by the apparatus includes caused by the apparatus;
the by the apparatus includes caused entirely by the apparatus;
the by the apparatus includes performed, at least in part, by the apparatus;
the by the apparatus includes performed entirely by the apparatus;
the at least partial closure in response to detecting the first time period is the same as the at least partial closure in response to detecting the second time period;
the at least partial closure in response to detecting the first time period is different from the at least partial closure in response to detecting the second time period;
the apparatus is configured such that, after the first connection set up, the detection of the second time period of the first type of time period is based on the second duration, by being only based on whether, for the second duration after the second time period of the first type of time period is started, no packet is received and processed to keep the first connection active, where at least one particular packet is received in connection with at least one of the first time period or the second time period, but is not received and processed to keep the first connection active, as a result of at least one of: the at least one particular packet being un-processable, the at least one particular packet being discarded, the at least one particular packet being a duplicate, or the at least one particular packet not being received in a manner so as to be processed by a software component;
the first parameter field is part of a data portion in the first packet;
the first parameter field is part of a header of the first packet;
the first packet is informational;
the set up of the first connection includes a period of time starting prior to the first packet being sent;
the set up of the first connection includes a period of time starting prior to the first packet being sent, when information is identified;
the set up of the first connection includes a period of time starting prior to the first packet being sent, when information is received;

the set up of the first connection includes a period of time starting prior to the first packet being sent, when the first packet is generated;

the set up of the first connection includes a period of time starting prior to the first packet being sent, when received information is used to generate the first packet;

the set up of the first connection includes a period of time starting with the first packet being sent;

the first packet includes a packet that is used for the set up of the first connection;

the first packet includes a packet that is used in association with the set up of the first connection;

the first packet includes a packet that is used in advance of a completion of the set up of the first connection;

the first packet is for use in the protocol, by being capable of being used by the node in accordance with the protocol;

the at least partial closure includes only a partial deactivation;

the at least partial closure includes a full deactivation;

the at least partial closure includes a release of a resource;

the at least partial closure includes a partial closure;

the at least partial closure includes a closure;

the at least partial closure includes a deactivation only for the apparatus;

the at least partial closure results in the first connection no longer being fully active;

the at least partial closure results in the first connection no longer being active;

the protocol includes one or more features of TCP, and one or more features not of TCP;

the first packet includes one or more features of a TCP packet, and one or more features not of a TCP packet;

the first connection includes one or more features of a TCP connection, and one or more features not of a TCP connection;

the first duration for detecting the first type of time period is based on the first information, by the first information specifying the first duration;

the first duration for detecting the first type of time period is based on the first information, by information identifying at least one generator for generating the first duration;

only the first duration for detecting the first type of time period is based on the first information;

the second duration of the second time period is different from the duration of the first time period;

the second duration of the second time period is the same as the duration of the first time period;

the third duration of the third time period is different from the duration of the first time period;

the third duration of the third time period is the same as the duration of the first time period;

the third duration of the third time period is different from the duration of the second time period;

the third duration of the third time period is the same as the duration of the second time period;

the first packet also includes data for use in determining the first time period;

the first information includes a first value representative of the first duration of the first time period, and a second value representative of the second duration of the second time period;

the first information includes a first value representative of the first duration of the first time period, and identification of a generator for generating a second value representative of the second duration of the second time period;

the first information includes identification of a generator for generating a first value representative of the first duration of the first time period, and for generating a second value representative of the second duration of the second time period;

the first information includes identification of a first generator for generating a first value representative of the first duration of the first time period, and identification of a second generator for generating a second value representative of the second duration of the second time period;

the first time period is detected in a first use scenario without the second nor third time periods being detected, the second time period is detected in a second use scenario without the first nor third time periods being detected, the third time period is detected in a third use scenario without the first nor second time periods being detected, and neither the first, second, nor third time periods are detected in a fourth use scenario;

the first duration of the first time period is determined based on the first information, after identifying the first information;

the first duration of the first time period is determined based on the first information, before setting up the first connection;

the first duration of the first time period is determined based on the first information, during setting up the first connection;

the first duration of the first time period is determined based on the first information, after setting up the first connection;

the first time period is triggered by one or more non-duration-related criteria that triggers the second time period;

the first time period is triggered by the same one or more non-duration-related criteria that triggers the second time period;

the first time period is triggered by different one or more non-duration-related criteria than that which triggers the second time period;

the first time period is that during which no packet is received in the first connection nor expected to be received;

the first time period is that during which no packet is received in the first connection;

the third time period is triggered by one or more non-duration-related criteria that triggers the second time period;

the third time period is triggered by the same one or more non-duration-related criteria that triggers the second time period;

the third time period is triggered by different one or more non-duration-related criteria than that which triggers the second time period;

the third time period is that during which no packet is received in the first connection nor expected to be received;

the third time period is that during which no packet is received in the first connection;

the first metadata is based on the first information;

the second time period is a changed version of the first time period;

the second time period is a changed instance of the first time period;

the first duration is changed to the second duration, where the change occurs while detection of the first time period is attempted;
the first duration is changed to the second duration, where the change occurs via a negotiation;
the first duration is changed to the second duration, where the change to the second duration includes a change in use of the first duration to a use of the second duration;
the first duration is changed to the second duration, where the change to the second duration includes a change in use of the first duration to a use of the second duration, in connection with different time periods;
the first duration is changed to the second duration, where the change to the second duration includes a change from an attempt to detect the first time period to an attempt to detect the second time period;
the first duration is changed to the second duration, where the change to the second duration includes a change from detecting the first time period to detecting the second time period;
the first time period and the second time period have at least one additional difference, in addition to duration, despite both being of the first type of time period;
the first time period and the second time period do not have at least one additional difference, in addition to duration;
the second time period is determined based on the first information;
the first duration of the first time period is negotiated between the apparatus and the node for the first connection, during the first connection set up;
the first connection set up includes all communications that precede completion of the first connection set up;
the duration of the second time period is determined based on the first information;
the duration of the third time period is determined based on the first information;
the first and second time periods are of a same duration;
the first and second time periods are of a different duration;
the first and second time periods are different instances of the same type of time period;
the first and second time periods are of the same type of time period, but are applied at different times during the first connection;
the first duration of the first time period is determined by being negotiated;
the second duration of the second time period is determined by being negotiated;
the third duration of the third time period is determined by being negotiated;
the first metadata is also for use in determining the second duration of the second time period;
the first metadata is not for use in determining the second duration of the second time period;
the first metadata is also for use in determining the third duration of the third time period;
the first metadata is not for use in determining the third duration of the third time period;
the first metadata describes a definition of at least one duration;
the first metadata defines at least one duration;
the first metadata includes at least one duration;
the first metadata describes a definition of at least one time period;
the first metadata describes other data that defines at least one duration;
the first metadata describes other data that defines at least one time period;
the first metadata describes other criteria-related data that defines at least one time period;
the first metadata describes duration data that defines at least one time period;
the first metadata describes duration criteria-related data that defines at least one time period;
the at least portion of the first connection set up includes only a subset of setting up the first connection;
the protocol includes a TCP-variant protocol;
the at least portion of the first connection set up includes an entirety of setting up the first connection;
the at least portion of the first connection set up includes one or more packet exchanges that occur after the first packet is sent;
the at least portion of the first connection set up includes one or more packet exchanges that occur after the first packet is sent prior to completion of the first connection set up;
the first time period is detected based on the first duration, by being detected when packet activity or a lack thereof meets one or more criteria for a span of the first duration;
the second time period is detected based on the second duration, by being detected when packet activity or a lack thereof meets one or more criteria for a span of the second duration;
the packet including no application data includes a ping;
the packet including no application data includes an empty acknowledgement packet;
the first type of time period includes an idle time period type;
the first and second time periods are both of the first type of time period, despite detecting time periods at different times;
the first and second time periods are both of the first type of time period, despite detecting time periods for different packets;
the first and second time periods are both of the first type of time period, despite detecting time periods for different types of packets;
the first type of time period is of the type that monitors an idle time period;
the first type of time period is of the type that monitors an idle time period, and the first and second time periods are both of the first type of time period, despite detecting idle time periods at different times;
the first type of time period is of the type that monitors an idle time period, and the first and second time periods are both of the first type of time period, despite detecting idle time periods for different packets;
the first type of time period is of the type that monitors an idle time period, and the first and second time periods are both of the first type of time period, despite detecting idle time periods for different types of packets;
the first and second time periods of the first type of time period differ only in duration;
the first and second time periods of the first type of time period are capable of differing in duration, but may have a same duration;
the first and second time periods of the first type of time period are capable of differing only in duration, but may have a same duration;

the first and second time periods of the first type of time period differ in duration and at least one criteria involving packet activity or a lack thereof over a duration span;

the first and second time periods of the first type of time period are capable of differing in duration and further differ in at least one criteria involving packet activity or a lack thereof over a duration span;

the first packet is not a SYN packet, while including at least one characteristics of the SYN packet;

the first packet is not a SYN packet, while including at least one characteristics of the SYN packet and at least one characteristics not of the SYN packet;

the generating includes creating from non-existence, to generate the first packet;

the generating includes modifying something existent, to generate the first packet;

the first information is received from a component internal to the apparatus;

the first information is received from a location external to the apparatus;

the first information includes other metadata from another connection;

the first packet includes a portion of data sent at any layer;

the first packet includes a frame;

the first time period is started in response to a received packet and the second time period are started in response to a sent packet;

the first time period is started in response to a sent packet and the second time period are started in response to a received packet;

the first time period is started in response to a received packet and the second time period are started in response to a received packet;

the first time period is started in response to a sent packet and the second time period are started in response to a sent packet;

the first time period and the second time period are started in response to different packets;

the first time period and the second time period are started in response to different types of packets;

the first and second time periods are of the first type of time period despite having a difference including at least one of: a different duration, an absolute start time, an absolute end time, a relative start time, a relative end time, a different state of the first connection, a role of at least one of a server or a client;

the first and second time periods are of the first type of time period despite having a difference including at least one of: a different duration, an absolute start time, an absolute end time, a relative start time relative to the first packet, a relative end time relative to the first packet, a different state of the first connection, a role of at least one of a server or a client;

the first and second time periods are of the first type of time period despite having a difference including: a different duration, an absolute start time, an absolute end time, a relative start time, a relative end time, a different state of the first connection, a role of at least one of a server or a client;

the first and second time periods are of the first type of time period by having a same or similar at least one of: definition, implementation specification, or detection causal event or criteria;

the first and second time periods are of the first type of time period by having a same or similar: definition, implementation specification, or detection causal event or criteria;

the third time period is detected based on the third duration, by being detected when no acknowledgement packet is received by the apparatus in the first connection and processed as an acknowledgement, during the third duration, for any sent packet sent by the apparatus in the first connection;

the third time period is detected based on the third duration, by being detected when no acknowledgement packet is received by the apparatus in the first connection and processed as an acknowledgement, during the third duration;

at least one of the first algorithm or the second algorithm is associated with an identifier;

at least one of the first algorithm or the second algorithm is associated with a standardized identifier;

at least one of the first algorithm or the second algorithm is associated with an identifier that is included with the first information;

at least one of the first algorithm or the second algorithm is associated with an identifier that is referenced by the first information;

at least one of the first algorithm or the second algorithm includes at least one of a formula, an expression, a function, a class, or a policy;

at least one of the first algorithm or the second algorithm includes a mechanism for generating or identifying at least one of the first duration, the second duration, or the third duration;

at least one of the first algorithm or the second algorithm is associated with an algorithm identifier;

at least one of the first algorithm or the second algorithm is performed by at least one generator;

the first algorithm and the second algorithm are associated with different identifiers;

the first algorithm is different from the second algorithm, while being based on at least one piece of common information;

the first algorithm is different from the second algorithm, while receiving, as input the first metadata;

the first algorithm and the second algorithm are both based on the first metadata;

the determination of the third duration is based the first algorithm, by the third duration being calculated using the first algorithm;

the determination of the second duration is based the second algorithm, by the second duration being calculated using the second algorithm;

the first algorithm includes a first set of one more rules, and the second algorithm includes a second set of one more rules;

the first algorithm includes a first set of one more procedures, and the second algorithm includes a second set of one more procedures;

the first algorithm includes a first set of one more steps, and the second algorithm includes a second set of one more steps;

the packet including no application data is sent or received without the second time period timer being reset, such that the packet including no application data is sent or received with another timer being reset;

the packet including no application data is sent or received without the second time period timer being reset;

the packet including no application data is sent or received without the second time period timer being reset, such that the packet including no application data does not affect the detection of the second time period;
the packet including no application data is capable of being sent without the second time period timer being reset;
the packet including no application data is capable of being received without the second time period timer being reset;
the packet including no application data is capable of only being sent without the second time period timer being reset;
the packet including no application data is capable of only being received without the second time period timer being reset;
the packet including no application data is capable of being sent and received without the second time period timer being reset;
the apparatus is a client, the packet is capable of being sent, and the second time period timer is of the client;
the apparatus is a server, the packet is capable of being received, and the second time period timer is of the client;
the second time period timer is of the client;
the second time period timer is utilized to detect the second time period;
the second time period timer is utilized to detect the second time period at the apparatus;
the second time period timer is utilized to detect another second time period at the node;
the packet including no application data is capable of being sent or received without the second time period timer being reset, to support an optional keep-alive feature that is optionally configured on a client node;
the packet including no application data is capable of being sent or received without the second time period timer being reset in at least one use case scenario;
the packet including no application data is capable of being sent or received without the second time period timer being reset in at least one use case scenario, and the packet including no application data is capable of being sent or received with the second time period timer being reset in at least one other case scenario;
the packet including no application data is capable of being sent or received with the second time period timer being reset, and, thereafter, the packet including no application data is capable of being sent or received without the second time period timer being reset;
a first instance of the packet including no application data is capable of being sent or received with the second time period timer being reset, and, thereafter, a second instance of the packet including no application data is capable of being sent or received without the second time period timer being reset;
a first instance of the packet including no application data is capable of being sent or received with the second time period timer being started, and, thereafter, a second instance of the packet including no application data is capable of being sent or received without the second time period timer being reset, where the first instance and the second instance are identical;
a first instance of the packet including no application data is capable of being sent or received with the second time period timer being started, and, thereafter, a second instance of the packet including no application data is capable of being sent or received without the second time period timer being reset, where the first instance and the second instance are different;
a first instance of the packet including no application data is capable of being sent or received with the second time period timer being reset, and, thereafter, a second instance of the packet including no application data is capable of being sent or received without the second time period timer being reset, where the first instance and the second instance are identical;
a first instance of the packet including no application data is capable of being sent or received with the second time period timer being reset, and, thereafter, a second instance of the packet including no application data is capable of being sent or received without the second time period timer being reset, where the first instance and the second instance are different;
a first instance of the packet including no application data is capable of being sent or received with the second time period timer being reset, and, thereafter, a second instance of the packet including no application data is capable of being sent or received without the second time period timer being reset, where the first instance and the second instance are different in terms of the contents thereof;
a first instance of the packet including no application data is capable of being sent or received with the second time period timer being reset, and, thereafter, a second instance of the packet including no application data is capable of being sent or received without the second time period timer being reset;
the packet including no application data is capable of being sent or received with the second time period timer being started, and the packet including no application data is capable of being sent or received without the second time period timer being reset;
the packet including no application data is capable of being sent or received with the second time period timer being started, and, thereafter, the packet including no application data is capable of being sent or received without the second time period timer being reset;
the application data includes data from an application;
the application data includes data of an application;
the application data includes data associated with an application;
the one or more packets and the at least one packet are the same;
the one or more packets and the at least one packet are different;
the absence of the one or more packets includes an absence of a single packet;
the absence of the one or more packets includes an absence of a plurality of packets;
the absence of the at least one packet includes an absence of a single packet;
the absence of the at least one packet includes an absence of a plurality of packets;
the absence of the one or more packets includes a presence of at least one particular packet;
the absence of the at least one packet includes a presence of at least one particular packet;
the absence of the one or more packets includes a presence of at least one particular packet of the same type;
the absence of the at least one packet includes a presence of at least one particular packet of the same type;
the absence of the one or more packets includes a presence of at least one particular packet of a different type;

the absence of the at least one packet includes a presence of at least one particular packet of a different type;

the detecting of the first time period is based on the absence of the one or more packets, by being detected when no packet is detected;

the detecting of the second time period is based on the absence of the at least one packet, by being detected when no packet is detected;

the one or more criteria includes a single criterion;

the one or more criteria includes multiple criteria;

the one or more criteria includes the third duration;

the one or more criteria involves the third duration;

the one or more criteria on which detection of the first time period and the second time period of the first type of time period are based, are the same;

the one or more criteria on which detection of the first time period and the second time period of the first type of time period are based, are different;

the one or more criteria includes a type of packet that starts a particular time period;

the one or more criteria includes one or more types of packets that starts a particular;

the one or more criteria includes a group of one or more acceptable types of packet that starts a particular time period;

the one or more criteria includes one or more acceptable types of packet that triggers detection a particular time period;

the one or more criteria includes one or more acceptable types of packet for the one or more packets based on which the corresponding absence is detected;

the one or more criteria includes one or more acceptable types of packet for the at least one packet based on which the corresponding absence is detected;

the one or more criteria that is different from that on which detection of the first time period and the second time period of the first type of time period are based, is different in all aspects;

the one or more criteria that is different from that on which detection of the first time period and the second time period of the first type of time period are based, is different in at least one aspect and is the same in at least one other aspect;

the use of the first duration is changed to the use of the second duration, where the change is capable of being at any time after the first connection set up;

the use of the first duration is changed to the use of the second duration is capable of being at any time immediately after the first connection set up;

the use of the first duration is changed to the use of the second duration, where the change is capable of being at any time in response to the first connection set up;

the use of the first duration is changed to the use of the second duration, by the first duration being changed to the second duration;

the at least one action does not include connection closure, while still affecting connection closure;

the resource the at least one action does not affect connection closure;

is released by the apparatus, by being released only by the apparatus;

the resource is released by the apparatus, by being released by the apparatus and at least one other node;

the resource is allocated for maintaining the first connection;

the resource is allocated for activating the first connection;

the resource includes a storage resource;

the resource includes a network resource; or the resource includes a processor resource.

54. A method, comprising:

at an apparatus:

identifying, at the apparatus, first information on which at least a first duration for detecting a first type of time period is based, the first type of time period being started based on detecting at least one of a received packet or a sent packet;

allocating a resource for a first connection;

generating a first packet including a first parameter field identifying first metadata for use in determining a second duration for detecting the first type of time period, the first packet for use in a protocol that is separate from a transmission control protocol (TCP);

setting up the first connection, by sending, from the apparatus to a node, the first packet to provide the first metadata to the node, for use by the node in determining the second duration for detecting the first type of time period;

at least partially closing the first connection by at least partially releasing the resource allocated for the first connection, based on detecting, as a function of the first duration, as a function of an absence of one or more packets, and by the apparatus during at least a portion of the first connection including at least a portion of the first connection set up: a first time period of the first type of time period;

at least partially closing the first connection by at least partially releasing the resource allocated for the first connection, based on detecting, as a function of the second duration, as a function of an absence of at least one packet, and by the apparatus after the first connection set up and when a use of the first duration is changed to a use of the second duration: a second time period of the first type of time period, such that, during the second time period of the first type of time period, a packet including no application data is capable of being sent or received without a second time period timer being reset; and performing at least one action, based on detecting, as a function of a third duration: a third time period of a second type of time period that is detected based on one or more criteria that is different from that on which detection of the first time period and the second time period of the first type of time period are based, such that the third duration is determined based on a first algorithm that is different from a second algorithm on which a determination of the second duration is based.

55. The method of claim 54, wherein the packet including no application data includes an empty packet.

56. The method of claim 54, wherein:

the apparatus is a server and the node is a client;

the packet including no application data is capable of being received;

the second time period timer is located at the client;

the at least one action includes a timer setting or resetting; and the at least one action does not include connection closure.

57. The method of claim 56, wherein the first packet also includes data, separate from the first metadata, for use in determining the third time period.

58. The method of claim 56, wherein the third time period is detected utilizing a particular timer, that is not utilized to detect the first time period nor the second time period.

59. The method of claim 56, wherein at least one aspect of the third duration of the third time period is negotiated, via a metadata negotiation, during the first connection set up between the apparatus and the node for the first connection.

60. The method of claim 56, wherein the second duration is determined as a function of the third duration.

61. The method of claim 56, wherein the third duration is determined as a function of the second duration.

62. The method of claim 56, wherein the third time period is detected as a function of the third duration, by being detected when no acknowledgement packet is detected, by the apparatus during the third duration, as being received and processed as an acknowledgement in the first connection to acknowledge a sent packet of a plurality of sent packets sent by the apparatus, where the third duration starts for each of the plurality of sent packets when at least one of the plurality of sent packets is sent.

63. The method of claim 62, wherein:
during the at least portion of the first connection set up, the detection of the first time period of the first type of time period is a function of the first duration, by being a function of whether, for the first duration, no packet is received and processed to keep the first connection active; and
during the first connection, the detection of the second time period of the first type of time period is a function of the second duration, by being a function of whether, for the second duration, no packet is received in the first connection and processed to keep the first connection active.

64. The method of claim 63, wherein:
the third time period of the second type of time period:
includes an acknowledgment (ACK) time period, and
is configured such that the one or more criteria requires that the third time period of the second type of time period is started based on an ACK-eliciting packet being sent, and is detected based on an absence of a received ACK packet,
where the at least one action does not include connection closure; and
the first and second time periods of the first type of time period:
do not include an ACK time period,
where the absence of one or more packets and the absence of at least one packet each include the absence of a received packet type that is not limited to an ACK packet type.

65. The method of claim 62, wherein the packet including no application data is capable of being received at the server with the second time period timer being started at the client, and, thereafter, the packet including no application data is capable of being received at the server without the second time period timer being reset at the client.

66. The method of claim 62, wherein, based on detecting the first time period of the first type of time period, the first connection is at least partially closed, without signaling the node in relation to the detection of the first time period based on detecting the first time period.

67. The method of claim 62, wherein the second duration is the same as the first duration, despite being capable of being different from the first duration.

68. The method of claim 62, wherein the first information is received for another connection other than the first connection.

69. The method of claim 62, wherein a single timer and a single timeout variable are utilized for detecting the third time period in connection with the plurality of sent packets.

70. The method of claim 62, wherein the one or more packets and the at least one packet include all packet types of received packets.

71. The method of claim 62, wherein the one or more packets and the at least one packet include one or more received packets.

72. The method of claim 62, wherein the one or more packets and the at least one packet include a plurality of packet types of received packets.

73. The method of claim 62, wherein, while an attempt is being made to detect at least one of the first time period or the second time period, at least one of the absence of at least one packet or the absence of one or more packets is capable of being detected in all possible disconnection scenarios.

74. The method of claim 62, wherein at least one of the absence of at least one packet or the absence of one or more packets is detected in a set of operational scenarios not limited to specific scenarios involving a subset of possible disconnection events.

75. The method of claim 62, wherein the protocol supports HyperText Transfer Protocol (HTTP) protocol for transporting at least some application data therewith.

76. An apparatus, comprising:
a non-transitory memory means storing instruction means; and
processor means in communication with the non-transitory memory means, wherein the processor means execute the instruction means to:
identify, at the apparatus, first information on which at least a first duration for detecting a first type of time period is based, the first type of time period being started in response to detecting at least one of a received packet or a sent packet;
allocate a resource for a first connection;
generate a first packet including a first parameter field identifying first metadata for use in determining a second duration for detecting the first type of time period, the first packet for use in a protocol that is different from a transmission control protocol (TCP);
set up the first connection, by sending, from the apparatus to a node, the first packet to provide the first metadata to the node, for use by the node in determining the second duration for detecting the first type of time period;
in response to detecting, based on the first duration and an absence of one or more packets and by the apparatus during at least a portion of the first connection including at least a portion of the first connection set up, a first time period of the first type of time period, at least partially close the first connection, by releasing, by the apparatus, the resource allocated for the first connection;
in response to detecting, based on the second duration and an absence of at least one packet and by the apparatus after the first connection set up and a use of the first duration is changed to a use of the second duration, a second time period of the first type of time period, at least partially close the first connection, by releasing, by the apparatus, the resource allocated for the first connection, such that, during the second time period of the first type of time period, a packet including no application data is capable of being sent or received without a second time period timer being reset; and in response to detecting, based on a third duration, a third time period of a second type of time period that is detected based on one or more criteria that is different from that on which detection of the first time period and the second time period of the first type of time period are based, perform at least one action, where the third duration is determined based on a first algorithm that is different from a second algorithm on which a determination of the second duration is based.

\* \* \* \* \*